United States Patent
Krishan

(10) Patent No.: US 11,888,957 B2
(45) Date of Patent: Jan. 30, 2024

(54) METHODS, SYSTEMS, AND COMPUTER READABLE MEDIA FOR LOCALITY AND SERVING SCOPE SET BASED NETWORK FUNCTION (NF) PROFILE PRIORITIZATION AND MESSAGE ROUTING

(71) Applicant: Oracle International Corporation, Redwood Shores, CA (US)

(72) Inventor: Rajiv Krishan, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/543,989

(22) Filed: Dec. 7, 2021

(65) Prior Publication Data

US 2023/0179681 A1 Jun. 8, 2023

(51) Int. Cl.
*H04L 67/61* (2022.01)
*H04L 67/51* (2022.01)
*H04L 67/63* (2022.01)

(52) U.S. Cl.
CPC .............. *H04L 67/61* (2022.05); *H04L 67/51* (2022.05); *H04L 67/63* (2022.05)

(58) Field of Classification Search
CPC ......... H04L 67/61; H04L 67/51; H04L 67/63; H04L 67/06
See application file for complete search history.

(56) References Cited

U.S. PATENT DOCUMENTS 6,014,558 A 1/2000 Thomas
8,069,101 B1 11/2011 von Groll et al.
(Continued)

FOREIGN PATENT DOCUMENTS

CN 114039874 A 2/2022
EP 3 716 692 A1 9/2020
(Continued)

OTHER PUBLICATIONS

Notice of Allowance and Fee(s) Due for U.S. Appl. No. 17/487,142 (dated Sep. 1, 2023).
(Continued)

*Primary Examiner* — Kevin T Bates
*Assistant Examiner* — Ranjan Pant
(74) *Attorney, Agent, or Firm* — Jenkins, Taylor & Hunt, P.A.

(57) ABSTRACT

A method for locality and serving scope set based network function (NF) profile prioritization and message routing includes, at an NF including at least one processor, receiving a service based interface (SBI) request including a preferred locality or a servingScope. The method further includes identifying an NF profile of a producer NF with an NF profile level locality or servingScope attribute that does not match the preferred locality or servingScope attribute in the SBI request and with a localitySet or servingScopeSet having a locality attribute or servingScopeSet attribute that matches the preferred locality or servingScope attribute in the SBI request. The method further includes setting an NF profile level priority of the NF profile based on a priority specified for the matching locality attribute in the localitySet or the servingScope attribute in the servingScopeSet.

18 Claims, 12 Drawing Sheets

(56) References Cited

U.S. PATENT DOCUMENTS

| | | |
|---|---|---|
| 8,069,181 B1 | 11/2011 | Krishnan et al. |
| 9,124,537 B2 | 9/2015 | Kolze |
| 9,246,762 B1 | 1/2016 | Watkins |
| 10,313,362 B2 | 6/2019 | Ahuja et al. |
| 10,609,530 B1 | 3/2020 | Patil et al. |
| 10,637,753 B1 | 4/2020 | Taft et al. |
| 10,686,667 B1 | 6/2020 | Subramaniam |
| 10,772,062 B1 | 9/2020 | Albasheir et al. |
| 10,819,636 B1 | 10/2020 | Goel |
| 11,109,307 B2 | 8/2021 | Rodrigo et al. |
| 11,220,027 B2 | 1/2022 | Heath, III et al. |
| 11,271,846 B2 | 3/2022 | Krishan |
| 11,330,027 B1 | 5/2022 | Khandekar et al. |
| 11,470,544 B2 | 10/2022 | Singh et al. |
| 11,483,694 B2 | 10/2022 | Krishan |
| 11,496,954 B2 | 11/2022 | Gupta et al. |
| 11,528,334 B2 | 12/2022 | Krishan |
| 11,570,262 B2 | 1/2023 | Sapra et al. |
| 11,589,298 B2 | 2/2023 | Sapra et al. |
| 11,652,895 B1 | 5/2023 | Sapra et al. |
| 2005/0181776 A1 | 8/2005 | Verma et al. |
| 2005/0193096 A1 | 9/2005 | Yu et al. |
| 2006/0010224 A1 | 1/2006 | Sekar et al. |
| 2007/0050331 A1 | 3/2007 | Bauman et al. |
| 2008/0101293 A1 | 5/2008 | Woo et al. |
| 2009/0222584 A1 | 9/2009 | Josefsberg et al. |
| 2013/0086245 A1 | 4/2013 | Lu et al. |
| 2013/0198269 A1 | 8/2013 | Fleischman et al. |
| 2013/0272123 A1 | 10/2013 | Lee et al. |
| 2014/0040975 A1 | 2/2014 | Raleigh et al. |
| 2015/0358385 A1 | 12/2015 | Ruellan et al. |
| 2016/0156513 A1 | 6/2016 | Zhang et al. |
| 2016/0350683 A1 | 12/2016 | Bester et al. |
| 2016/0380906 A1 | 12/2016 | Hodique et al. |
| 2017/0077751 A1 | 3/2017 | Forbes |
| 2017/0221015 A1 | 8/2017 | June et al. |
| 2018/0205637 A1 | 7/2018 | Li |
| 2018/0262625 A1 | 9/2018 | McCarley et al. |
| 2018/0285794 A1 | 10/2018 | Gray-Donald et al. |
| 2018/0324247 A1 | 11/2018 | Hood et al. |
| 2019/0007366 A1 | 1/2019 | Voegele et al. |
| 2019/0116217 A1 | 4/2019 | Dhanabalan |
| 2019/0140895 A1 | 5/2019 | Ennis, Jr. et al. |
| 2019/0158364 A1* | 5/2019 | Zhang ................ H04L 41/5054 |
| 2019/0166001 A1 | 5/2019 | Ma et al. |
| 2019/0222633 A1 | 7/2019 | Howes et al. |
| 2019/0230556 A1 | 7/2019 | Lee |
| 2019/0245767 A1 | 8/2019 | Di Girolamo et al. |
| 2019/0342229 A1 | 11/2019 | Khinvasara et al. |
| 2019/0394284 A1 | 12/2019 | Baghel et al. |
| 2020/0036754 A1 | 1/2020 | Livanos |
| 2020/0059420 A1 | 2/2020 | Abraham |
| 2020/0106812 A1 | 4/2020 | Verma et al. |
| 2020/0127916 A1 | 4/2020 | Krishan |
| 2020/0136911 A1 | 4/2020 | Assali et al. |
| 2020/0137174 A1 | 4/2020 | Stammers et al. |
| 2020/0153886 A1 | 5/2020 | Dhanabalan |
| 2020/0305033 A1 | 9/2020 | Keller et al. |
| 2020/0314615 A1 | 10/2020 | Patil et al. |
| 2020/0336554 A1 | 10/2020 | Deshpande et al. |
| 2020/0367148 A1 | 11/2020 | Baek et al. |
| 2021/0007023 A1 | 1/2021 | Umapathy et al. |
| 2021/0044481 A1 | 2/2021 | Xu et al. |
| 2021/0076248 A1 | 3/2021 | Kallam et al. |
| 2021/0099856 A1 | 4/2021 | Cakulev et al. |
| 2021/0136602 A1 | 5/2021 | Pokkunuri et al. |
| 2021/0168055 A1 | 6/2021 | Lair |
| 2021/0204200 A1 | 7/2021 | Krishan et al. |
| 2021/0235254 A1 | 7/2021 | Farooq |
| 2021/0273977 A1 | 9/2021 | Karasaridis et al. |
| 2021/0274392 A1 | 9/2021 | Dao et al. |
| 2021/0297935 A1 | 9/2021 | Belling et al. |
| 2021/0367916 A1 | 11/2021 | Belling et al. |
| 2021/0368427 A1 | 11/2021 | Rommer et al. |
| 2021/0385286 A1 | 12/2021 | Wang et al. |
| 2021/0385732 A1 | 12/2021 | Reyes et al. |
| 2022/0038545 A1 | 2/2022 | Krishan |
| 2022/0070648 A1 | 3/2022 | Krishan |
| 2022/0103644 A1 | 3/2022 | Park et al. |
| 2022/0110082 A1 | 4/2022 | Belling et al. |
| 2022/0131945 A1 | 4/2022 | Sapra et al. |
| 2022/0159464 A1 | 5/2022 | Rajput et al. |
| 2022/0191294 A1 | 6/2022 | Yang et al. |
| 2022/0264432 A1* | 8/2022 | Reyes ................ H04W 76/11 |
| 2022/0286949 A1 | 9/2022 | Sapra et al. |
| 2022/0295384 A1 | 9/2022 | Gupta et al. |
| 2022/0330085 A1* | 10/2022 | Li ................ H04L 67/565 |
| 2022/0346188 A1 | 10/2022 | Malhotra |
| 2022/0394453 A1 | 12/2022 | Goel |
| 2022/0394597 A1 | 12/2022 | Goel |
| 2022/0417783 A1 | 12/2022 | Srivastava et al. |
| 2023/0052267 A1 | 2/2023 | Goel et al. |
| 2023/0096969 A1 | 3/2023 | Sapra et al. |
| 2023/0099676 A1 | 3/2023 | Jayaramachar et al. |

FOREIGN PATENT DOCUMENTS

| | | | |
|---|---|---|---|
| EP | 4238295 A1 | 9/2023 | |
| KR | 20190088060 A | 7/2019 | |
| KR | 20220006908 A | 1/2022 | |
| WO | WO 2019/076276 A1 | 4/2019 | |
| WO | WO 2019/144321 A1 | 8/2019 | |
| WO | WO 2019/215308 A1 | 11/2019 | |
| WO | WO 2020/001842 A1 | 1/2020 | |
| WO | WO 2020/030291 A1 | 2/2020 | |
| WO | WO 2020/083516 A1 | 4/2020 | |
| WO | WO 2020/192254 A1 | 10/2020 | |
| WO | WO 2021/011933 A1 | 1/2021 | |
| WO | WO 2021/012787 A1 | 1/2021 | |
| WO | WO 2021/047551 A1 | 3/2021 | |
| WO | WO 2021/092441 A1 | 5/2021 | |
| WO | WO-2021110287 A1 * | 6/2021 | ......... H04L 41/5051 |
| WO | WO 2021219385 A1 | 11/2021 | |
| WO | WO 2022/025987 A1 | 2/2022 | |
| WO | WO 2022/050987 A1 | 3/2022 | |
| WO | WO 2022/093319 A1 | 5/2022 | |
| WO | WO 2022152870 A1 | 7/2022 | |
| WO | WO 2022/197531 A1 | 9/2022 | |
| WO | WO 2022/197533 A1 | 9/2022 | |
| WO | WO-2022179713 A1 * | 9/2022 | |
| WO | WO 2022/256306 A1 | 12/2022 | |

OTHER PUBLICATIONS

Non-Final Office Action for U.S. Appl. No. 17/397,968 (dated Aug. 23, 2023).

Notice of Publication for European Patent Application Serial No. 21731870.8 (dated Aug. 9, 2023).

Applicant-Initiated Interview Summary for U.S. Appl. No. 17/397,968 (dated Jul. 24, 2023).

Advisory Action for U.S. Appl. No. 17/397,968 (dated Jul. 14, 2023).

First Examination Report for Indian Patent Application Serial No. 202247065596 (dated May 30, 2023).

Final Office Action for U.S. Appl. No. 17/337,356 (dated Jun. 26, 2023).

Notice of Publication for European Patent Application No. 21713526.8 (dated May 10, 2023).

Examiner-Initiated Interview Summary for U.S. Appl. No. 17/672,639 (dated Apr. 21, 2023).

Non-Final Office Action for U.S. Appl. No. 17/487,142 (dated May 8, 2023).

Examiner-Initiated Interview Summary for U.S. Appl. No. 17/337,356 dated May 2, 2023.

Non-Final Office Action for U.S. Appl. No. 17/468,076 (dated Apr. 28, 2023).

Final Office Action for U.S. Appl. No. 17/397,968 (dated Apr. 27, 2023).

Notice of Allowance for U.S. Appl. No. 17/672,639 dated Mar. 20, 2023.

(56) References Cited

OTHER PUBLICATIONS

Examiner-Initiated Interview Summary for U.S. Appl. No. 17/397,968 (dated Mar. 21, 2023).
Examiner-Initiated Interview Summary for U.S. Appl. No. 17/672,639 (dated Mar. 7, 2023).
Non-Final Office Action for U.S. Appl. No. 17/337,356 (dated Jan. 17, 2023).
Examination Report for Patent Application No. IN202147036462 (dated Dec. 29, 2022).
Notice of Publication for U.S. Appl. No. 17/356,461 (dated Dec. 29, 2022).
Ex Parte Quayle Action for U.S. Appl. No. 17/672,639 (Dec. 23, 2022).
Notice of Publication for International Application Serial No. PCT/US2022/031566 (dated Dec. 8, 2022).
Non-Final Office Action for U.S. Appl. No. 17/397,968 (dated Dec. 9, 2022).
"3rd Generation Partnership Project; Technical Specification Group Core Network and Terminals; 5G System; Network Function Repository Services; Stage 3 (Release 17)," 3GPP TS 29.510, V17.4.0, pp. 1-284 (Dec. 2021).
Notification of Transmittal of the International Search Report and the Written Opinion of the International Searching Authority, or the Declaration for International Application No. PCT/US2022/033429 (dated Sep. 28, 2022).
Notice of Allowance and Fee(s) Due for U.S. Appl. No. 17/082,871 (dated Sep. 28, 2022).
Notification of Transmittal of the International Search Report and the Written Opinion of the International Searching Authority, or the Declaration for International Application No. PCT/US2022/031566 (dated Sep. 2, 2022).
Examiner-Initiated Interview Summary for U.S. Appl. No. 17/672,639 (dated Aug. 10, 2022).
Notice of Allowance and Fee(s) Due for U.S. Appl. No. 16/945,794 (dated Aug. 2, 2022).
Non-Final Office Action for U.S. Appl. No. 17/672,639 (dated Aug. 25, 2022).
Notice of Allowance for U.S. Appl. No. 17/200,777 (dated Jun. 30, 2022).
Orange, "HTTP2 Connection Flow Control Usage", 3GPP TSG WG4 Meeting #85, pp. 1-2 (May 21-25, 2018).
Notification of Transmittal of the International Search Report and the Written Opinion of the International Searching Authority, or the Declaration for International Application No. PCT/US2022/019850 (dated Jun. 8, 2022).
Final Office Action for U.S. Appl. No. 17/082,871 (dated Jun. 6, 2022).
Notice of Allowance for U.S. Appl. No. 17/009,725 (dated Jun. 13, 2022).
Commonly-Assigned, co-pending U.S. Appl. No. 17/672,639 for "Methods, Systems, and Computer Readable Media for Dynamic Optimized Network Function Discovery for Consumer Network Functions" (Unpublished, filed Feb. 5, 2022).
"3rd Generation Partnership Project; Technical Specification Group Core Network and Terminals; 5G System; Network Function Repository Services, Stage 3 (Release 16)," 3GPP TS 29.510, V16.6.0, pp. 1-227 (Jan. 2021).
Notification of Transmittal of the International Search Report and the Written Opinion of the International Searching Authority, or the Declaration for International Application No. PCT/US2022/019848 (dated Jun. 14, 2022).
Advisory Action and Examiner-Initiated Interview Summary for U.S. Appl. No. 16/945,794 (dated May 20, 2022).
Notice of Allowance for U.S. Appl. No. 17/203,693 (dated Mar. 17, 2022).
Final Office Action for U.S. Appl. No. 16/945,794 (dated Feb. 8, 2022).
Non-Final Office Action for U.S. Appl. No. 17/082,871 (dated Feb. 7, 2022).
Commonly-Assigned, co-pending U.S. Appl. No. 17/485,284 for "Methods, Systems and Computer Readable Media For Providing Priority Resolver for Resolving Priorities and Network Function (NF) Instances" (Unpublished, filed Sep. 24, 2021).
Notice of Allowance and Fee(s) Due for U.S. Appl. No. 16/356,446 (dated Sep. 30, 2021).
Notification of Transmittal of the International Search Report and the Written Opinion of the International Searching Authority, or the Declaration for International Application No. PCT/US2021/033031 (dated May 18, 2021).
Non-Final Office Action for U.S. Appl. No. 16/945,794 (dated Sep. 15, 2021).
"3rd Generation Partnership Project; Technical Specification Group Services and System Aspects; Security architecture and procedures for 5G system (Release 17)," 3GPP TS 33.501, V17.3.0, pp. 1-258 (Sep. 2021).
"3rd Generation Partnership Project; Technical Specification Group Core Network and Terminals; 5G System; Network Function Repository Services; Stage 3 (Release 17)," 3GPP TS 29.510, V17.3.0, pp. 1-271 (Sep. 2021).
"3rd Generation Partnership Project; Technical Specification Group Services and System Aspects; System architecture for the 5G System (5GS); Stage 2 (Release 17)," 3GPP TS 23.501, V17.2.0, pp. 1-542 (Sep. 2021).
"3rd Generation Partnership Project; Technical Specification Group Core Network and Terminals; 5G System; Technical Realization of Service Based Architecture; Stage 3 (Release 17)," 3GPP TS 29.500, V17.4.0, pp. 1-109 (Sep. 2021).
Notification of Transmittal of the International Search Report and the Written Opinion of the International Searching Authority, or the Declaration for International Application No. PCT/US2021/024000 (dated Jun. 24, 2021).
Non-Final Office Action for U.S. Appl. No. 16/356,446 (dated Jun. 16, 2021).
Notification of Transmittal of the International Search Report and the Written Opinion of the International Searching Authority, or the Declaration for U.S. Patent Application Serial No. PCT/US2021/020120 (dated Jun. 1, 2021).
"TCP congestion control," Wikipedia, pp. 1-15 (Mar. 4, 2021).
"3rd Generation Partnership Project; Technical Specification Group Core Network and Terminals; Numbering, addressing and identification; (Release 17)," 3GPP TS 23.003, V17.1.0, pp. 1-143 (Mar. 2021).
"3rd Generation Partnership Project; Technical Specification Group Core Network and Terminals; 5G System; Network Function Repository Services; Stage 3 (Release 17)," 3GPP TS 29.510, V17.1.0, pp. 1-243 (Mar. 2021).
"3rd Generation Partnership Project; Technical Specification Group Core Network and Terminals; 5G System; Session Management Services; Stage 3 (Release 17)," 3GPP 29.502, V17.1.0, pp. 1-299 (Jun. 2021).
"3rd Generation Partnership Project; Technical Specification Group Core Network and Terminals; 5G System; Principles and Guidelines for Services Definition; Stage 3 (Release 17)," 3GPP TS 29.501, V17.2.0, pp. 1-78 (Jun. 2021).
"3rd Generation Partnership Project; Technical Specification Group Core Network and Terminals; 5G System; Technical Realization of Service Based Architecture; Stage 3 (Release 17)," 3GPP TS 29.500, V17.2.0, pp. 1-100 (Mar. 2021).
"3rd Generation Partnership Project; Technical Specification Group Services and System Aspects; Security architecture and procedures for 5G system (Release 17)," 3GPP TS 33.501, V17.1.0, pp. 1-256 (Mar. 2021).
"3rd Generation Partnership Project; Technical Specification Group Core Network and Terminals; 5G System; Public Land Mobile Network (PLMN) Interconnection; Stage 3 (Release 17)," 3GPP TS 29.573, V17.0.0, pp. 1-100 (Mar. 2021).
"3rd Generation Partnership Project; Technical Specification Group Services and System Aspects; System architecture for the 5G System (5GS); Stage 2 (Release 17)," 3GPP TS 23.501, V17.0.0, pp. 1-489 (Mar. 2021).

(56) References Cited

OTHER PUBLICATIONS

"3rd Generation Partnership Project; Technical Specification Group Core Network and Terminals; 5G System; Network Function Repository Services; Stage 3 (Release 17)," 3GPP TS 29.510, V17.0.0, pp. 1-229 (Dec. 2020).

"3rd Generation Partnership Project; Technical Specification Group Core Network and Terminals; 5G System; Technical Realization of Service Based Architecture; Stage 3 (Release 17)," 3GPP TS 29.500, V17.1.0, pp. 1-90 (Dec. 2020).

Advisory Action for U.S. Appl. No. 16/356,446 (dated Dec. 22, 2020).

Final Office Action for U.S. Appl. No. 16/356,446 (dated Sep. 8, 2020).

"3rd Generation Partnership Project; Technical Specification Group Core Network and Terminals; 5G System; Network Function Repository Services; Stage 3 (Release 16)," 3GPP TS 29.510 V16.4.0, pp. 1-206 (Jul. 2020).

"3rd Generation Partnership Project; Technical Specification Group Services and System Aspects; Procedures for the 5G System (5GS); Stage 2 (Release 17)," 3GPP TS 23.502, V17.0.0, pp. 1-646 (Mar. 2021).

"3rd Generation Partnership Project; Technical Specification Group Services and System Aspects; Procedures for the 5G System (5GS); Stage 2 (Release 16)," 3GPP TS 23.502 V16.4.0, pp. 1-582 (Mar. 2020).

"3rd Generation Partnership Project; Technical Specification Group Services and System Aspects; System architecture for the 5G System (5GS); Stage 2 (Release 16)," 3GPP TS 23.501 V16.4.0, pp. 1-430 (Mar. 2020).

Non-Final Office Action for U.S. Appl. No. 16/356,446 (dated May 11, 2020).

Nokia et al., "Discussion paper on authorization for Model D Indirect communications", 3GPP TSG SA WG3; S3-194380 (Nov. 11, 2019).

Belshe et al., "Hypertext Transfer Protocol Version 2 (HTTP/2)," Internet Engineering Task Force (IETF), RFC 7540, pp. 1-96 (May 2015).

Fielding et al. "Hypertext Transfer Protocol (HTTP/1.1): Semantics and Content", Internet Engineering Taskforce (IETF) Request for Comments: 7231, IEFT RFC 7231, pp. 1-102 (Jun. 2014).

Vixie et al., "Dynamic Updates in the Domain Name System (DNS Update)," Network Working Group, RFC 2136, pp. 1-26 (Apr. 1997).

\* cited by examiner

US 11,888,957 B2

METHODS, SYSTEMS, AND COMPUTER READABLE MEDIA FOR LOCALITY AND SERVING SCOPE SET BASED NETWORK FUNCTION (NF) PROFILE PRIORITIZATION AND MESSAGE ROUTING

TECHNICAL FIELD

The subject matter described herein relates routing messages in a communications network. More particularly, the subject matter described herein relates to prioritizing NF profiles using priorities specified for locality and serving scope attributes in locality and serving scope sets and routing messages to producer NFs selected based on the priorities.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. The terms "service profiles" and "NF profiles" are used interchangeably herein. Consumer NFs can obtain information about producer NF instances that have registered with the NRF through the NF service discovery procedure. According to the NF service discovery procedure, a consumer NF sends an NF discovery request to the NRF. The NF discovery request includes query parameters that the NRF uses to locate NF profiles of producer NFs capable of providing the service identified by the query parameters. NF profiles are data structures that define the type of service provided by a producer NF instance as well as contact and capacity information regarding the producer NF instance.

In addition to consumer NFs, another type of network node that can invoke the NF service discovery procedure to obtain information about NF service instances is a service communication proxy (SCP). The case where the SCP uses the NF service discovery procedure to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances. The communications model where consumer NFs communicate with producer NFs via the SCP is referred to as the indirect communications model.

In addition to the SCP, another example of an intermediate proxy that forwards traffic between producer and consumer NFs is the security edge protection proxy (SEPP). The SEPP is the network function used to protect control plane traffic that is exchanged between different 5G public land mobile networks (PLMNs). As such, the SEPP performs message filtering, policing and topology hiding for all application programming interface (API) messages that are transmitted between PLMNs.

One problem that can occur in 5G and other communications networks is that 3GPP standards do not provide an efficient mechanism for setting different priorities for different locality and servingScope attributes of an NF profile. An NF profile has a locality attribute, which defines the geographic location of the producer NF, a servingScope attribute, which defines an area served by the producer NF, and a priority attribute, which defines the priority set by the producer NF when it registers its NF profile with the NRF. Current 3GPP standards do not specify a mechanism for producer NFs to set different priorities for different localities and servingScopes. The priority attribute is distinct from the locality and servingScope attributes in an NF profile, and the 3GPP definition for the NF profile data type only allows the specification of a single priority attribute value that applies at the NF profile level.

Accordingly, there exists a need for improved locality and serving scope based NF profile prioritization and message routing.

SUMMARY

A method for locality and serving scope set based network function (NF) profile prioritization and message routing includes, at an NF including at least one processor, receiving a service based interface (SBI) request including a preferred locality or a servingScope attribute. The method further includes identifying an NF profile of a producer NF with an NF profile level locality or servingScope attribute that does not match the preferred locality or servingScope attribute in the SBI request and with a localitySet or servingScopeSet having a locality attribute or servingScopeSet attribute that matches the preferred locality or servingScope attribute in the SBI request. The method further includes setting an NF profile level priority of the NF profile based on a priority specified for the matching locality attribute in the localitySet or the servingScope attribute in the servingScopeSet.

According to another aspect of the subject matter described herein, the NF comprises an NF repository function (NRF), receiving an SBI request includes receiving an NF discovery request including the preferred locality attribute, identifying the NF profile includes identifying the NF profile with a localitySet having a locality attribute that matches the preferred locality attribute, and setting the NF profile level priority includes replacing a value of the NF profile level priority attribute in the NF profile with a value of a priority attribute of the matching locality attribute in the localitySet.

According to another aspect of the subject matter described herein, the NF comprises an NF repository function (NRF), receiving an SBI request includes receiving an NF discovery request including the servingScope attribute, identifying the NF profile includes identifying the NF profile with a servingScopeSet having a servingScopeSet attribute that matches the servingScope attribute in the NF discovery request, and setting the NF profile level priority includes replacing a value of an NF profile level priority attribute in the NF profile with a value of a priority attribute of the matching servingScope attribute in the servingScopeSet.

According to another aspect of the subject matter described herein, the NF comprises a service communication proxy (SCP) or a security edge protection proxy (SEPP), receiving an SBI request includes receiving an NF service request including the preferred locality attribute, the method further comprises sending an NF discovery request including the preferred locality attribute value to an NRF, receiving an NF discovery response including a plurality of NF profiles, including the NF profile, identifying the NF profile includes identifying the NF profile with a localitySet having a locality attribute that matches the preferred locality attribute, setting the NF profile level priority includes replacing a value of the NF profile level priority attribute in the NF profile with a value of a priority attribute of the matching locality attribute in the localitySet and the method further comprises routing the NF service request to the producer NF based on the value of the NF profile level priority attribute.

According to another aspect of the subject matter described herein, routing the NF service request to the producer NF includes routing an initial NF service request to the producer NF.

According to another aspect of the subject matter described herein, routing the NF service request to the producer NF includes performing alternate routing of the NF service request to the producer NF.

According to another aspect of the subject matter described herein, the NF comprises a service communication proxy (SCP) or a security edge protection proxy (SEPP), receiving an SBI request includes receiving an NF service request including the servingScope attribute, the method further comprises sending an NF discovery request including the servingScope attribute to an NRF, receiving an NF discovery response including a plurality of NF profiles, including the NF profile, identifying the NF profile includes identifying the NF profile with a servingScopeSet having a servingScope attribute that matches the servingScope attribute in the NF service request, setting the NF profile level priority includes replacing a value of the NF profile level priority attribute in the NF profile with a value of a priority attribute of the matching servingScope attribute in the servingScopeSet, and the method further comprises routing the NF service request to the producer NF based on the value of the NF profile level priority attribute.

According to another aspect of the subject matter described herein, routing the NF service request to the producer NF includes routing an initial NF service request to the producer NF.

According to another aspect of the subject matter described herein, routing the NF service request to the producer NF includes performing alternate routing of the NF service request to the producer NF.

According to another aspect of the subject matter described herein, the localitySet and servingScopeSet comprise attributes of the NF profile that are separate from the NF profile level locality and servingScope attributes of the NF profile and include priority attribute values that are separate from the NF profile level priority attribute value.

According to another aspect of the subject matter described herein, a system for locality and serving scope set based network function (NF) profile prioritization and message routing is provided. The system includes an NF including at least one processor. The system further includes an NF profile prioritizer implemented by the at least one processor for receiving a service based interface (SBI) request including a preferred locality or a servingScope attribute, identifying an NF profile of a producer NF with an NF profile level locality or servingScope attribute that does not match the preferred locality or servingScope attribute in the SBI request and with a localitySet or servingScopeSet having a locality attribute or servingScopeSet attribute that matches the preferred locality or servingScope attribute in the SBI request, and setting an NF profile level priority of the NF profile based on a priority specified for the matching locality attribute in the localitySet or the servingScope attribute in the servingScopeSet.

According to another aspect of the subject matter described herein, the NF comprises an NF repository function (NRF), the SBI request comprises an NF discovery request including the preferred locality attribute, the NF profile prioritizer is configured to identify the NF profile with a localitySet having a locality attribute that matches the preferred locality attribute and set the NF profile level priority by replacing a value of the NF profile level priority attribute in the NF profile with a value of a priority attribute of the matching locality attribute in the localitySet.

According to another aspect of the subject matter described herein, the NF comprises an NF repository function (NRF), the SBI request includes an NF discovery request including the servingScope attribute, and the NF profile prioritizer is configured to identify the NF profile with a servingScopeSet having a servingScopeSet attribute that matches the servingScope attribute in the NF discovery request and set the NF profile level priority by replacing a value of an NF profile level priority attribute in the NF profile with a value of a priority attribute of the matching servingScope attribute in the servingScopeSet.

According to another aspect of the subject matter described herein, the NF comprises a service communication proxy (SCP) or a security edge protection proxy (SEPP), the SBI request includes an NF service request including the preferred locality attribute, the SCP or SEPP is configured to send an NF discovery request including the preferred locality attribute to an NRF and receive an NF discovery response including a plurality of NF profiles, including the NF profile, and the NF profile prioritizer is configured to identify the NF profile with a localitySet having a locality attribute that matches the preferred locality attribute and set the NF profile level priority by replacing a value of the NF profile level priority attribute in the NF profile with a value of a priority attribute of the matching locality attribute in the localitySet and the SCP or SEPP is configured to route the NF service request to the producer NF based on the value of the NF profile level priority attribute.

According to another aspect of the subject matter described herein, the SCP or SEPP is configured to perform initial routing of the SBI service request to the producer NF.

According to another aspect of the subject matter described herein, the SCP or SEPP is configured to perform alternate routing of the SBI service request to the producer NF.

According to another aspect of the subject matter described herein, the NF comprises a service communications proxy (SCP) or a security edge protection proxy (SEPP), the SBI request includes an NF service request including the servingScope attribute, the SCP or SEPP is configured to send an NF discovery request to an NRF including the servingScope attribute and receive an NF discovery response including a plurality of NF profiles, including the NF profile, the NF profile prioritizer is configured to identify the NF profile with a servingScopeSet having a servingScope attribute that matches the servingScope attribute in the NF service request and set the NF profile level priority by replacing a value of the NF profile level priority attribute in the NF profile with a value of a priority attribute of the matching servingScope attribute in the servingScopeSet, and the SCP or SEPP is configured to route the NF service request to the producer NF based on the value of the NF profile level priority attribute.

According to another aspect of the subject matter described herein, the SCP or SEPP is configured to perform initial or alternate routing of the NF service request to the producer NF.

According to another aspect of the subject matter described herein, the localitySet and servingScopeSet comprise attributes of the NF profile that are separate from the NF profile level locality and servingScope attributes of the NF profile and include priority attribute values that are separate from the NF profile level priority attribute value.

According to another aspect of the subject matter described herein, a non-transitory computer readable medium having stored thereon executable instructions that when executed by a processor of a computer control the computer to perform steps is provided. The steps include receiving a service based interface (SBI) request including a preferred locality or a servingScope attribute. The steps further include identifying a network function (NF) profile of a producer NF with an NF profile level locality or servingScope attribute that does not match the preferred locality or servingScope attribute in the SBI request and with a localitySet or servingScopeSet having a locality attribute or servingScopeSet attribute that matches the preferred locality or servingScope attribute in the SBI request. The steps further include setting an NF profile level priority of the NF profile based on a priority specified for the matching locality attribute in the localitySet or the servingScope attribute in the servingScopeSet.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
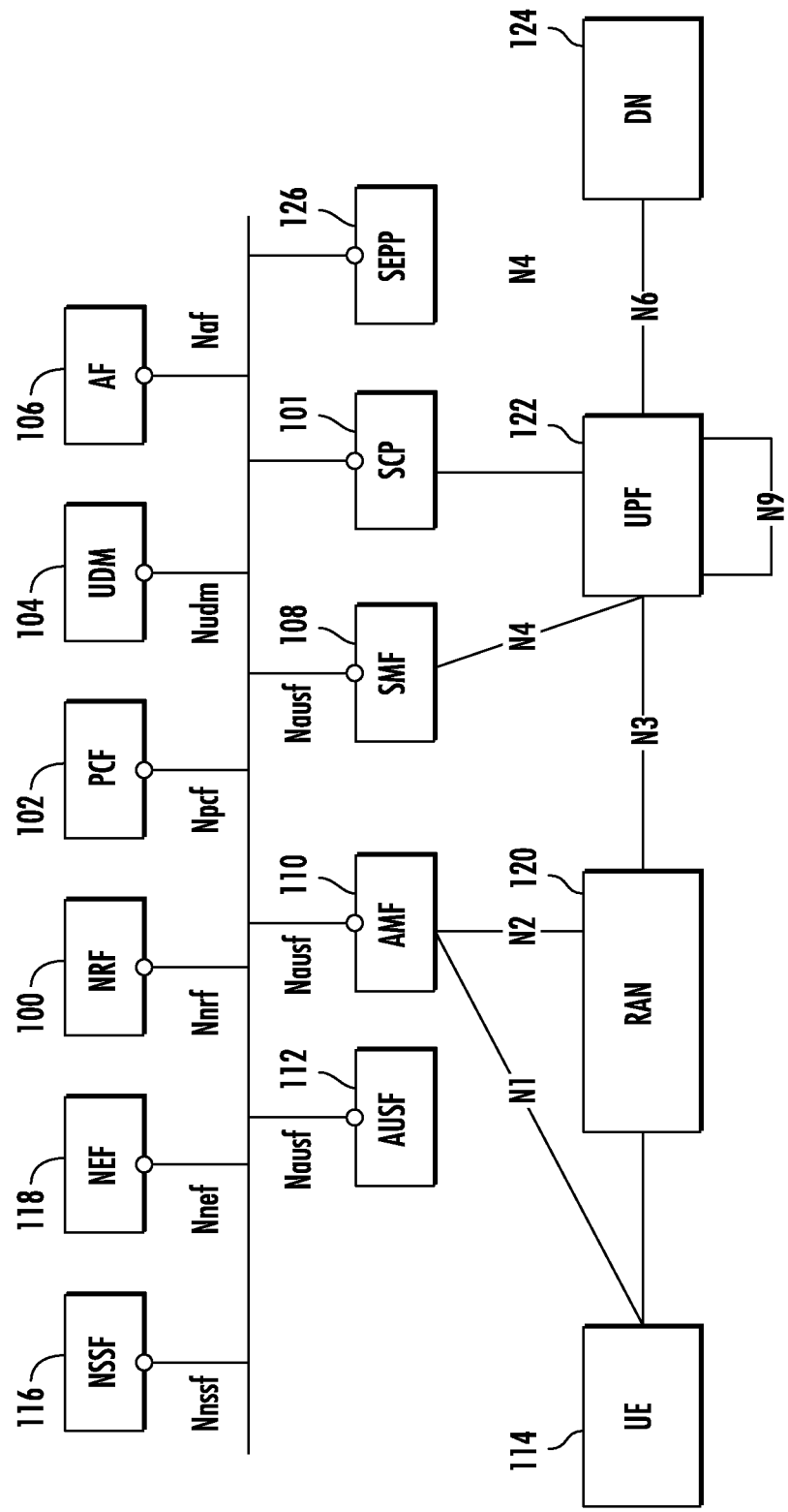
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs.

NRF 100 is a repository for NF or service profiles of producer NF instances. In order to communicate with a producer NF instance, a consumer NF or an SCP must obtain the NF or service profile of the producer NF instance from NRF 100. The NF or service profile is a JavaScript object notation (JSON) data structure defined in 3GPP TS 29.510. The NF or service profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

The 3GPP specifications for 5G networks allow multiple producer NFs to register with the NRF for providing the same service. For example, in lines 1-4 of FIG. 2, producer NFs 200 and 202 each register with NRF 100 to provide SDM service. When registering with NRF 100, producer NFs may publish various parameters that are usable by SCPs, SEPPs or consumer NFs to select a producer NF. These parameters or attributes include:
priority,
servingScope,
locality,
capacity,
etc.

Figure 2:
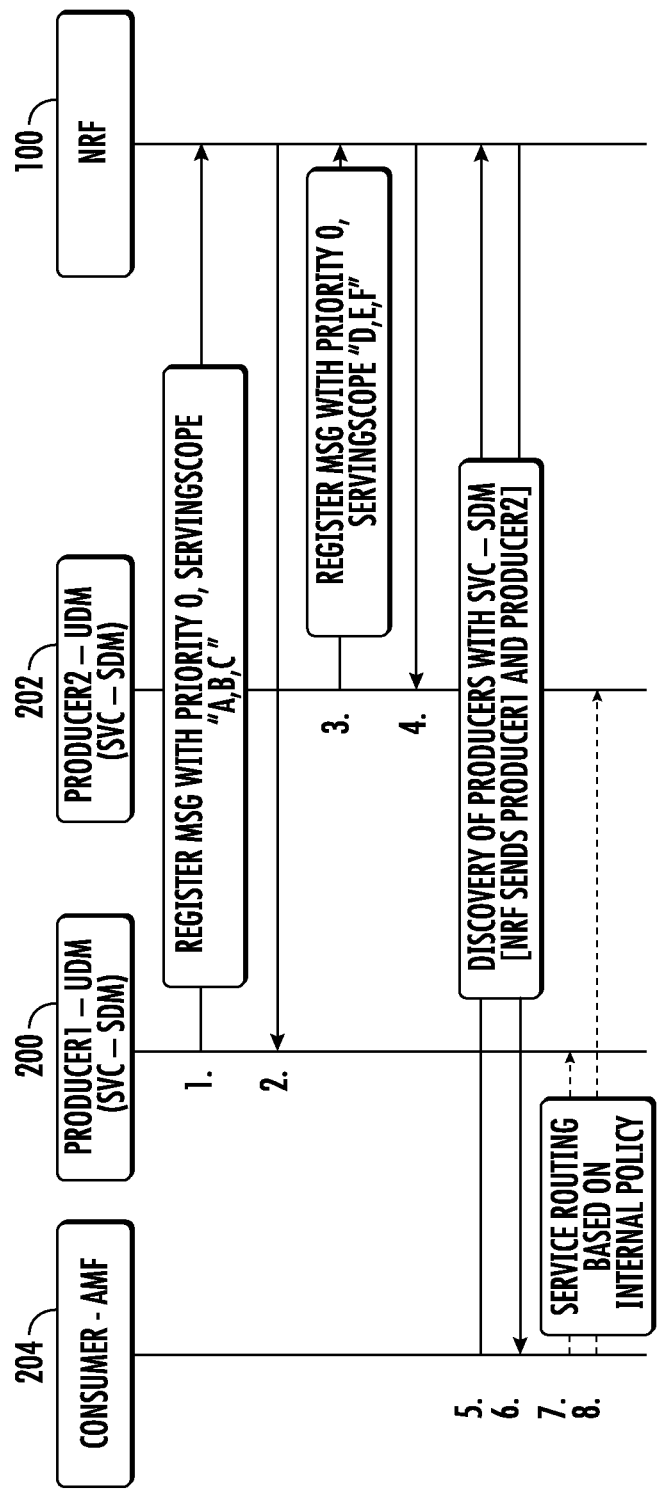
FIG. 2 is a message flow diagram illustrating exemplary messages exchanged in NF registration, discovery, and service routing.

In lines 5 and 6 of the message flow diagram in FIG. 2, consumer NF 204 initiates NF discovery with NRF 100, and NRF responds to consumer NF 204 with NF profiles that match query parameters in the NF discover request. Consumer NF 204 uses its own business logic to select a producer NF based on additional rules/criteria. In lines 7 and 8 of the message flow diagram, consumer NF 204 routes NF service requests to producer NFs 200 or 202, which were prioritized and selected based on an internal policy of consumer NF 204.

As stated above, one problem that can occur in 5G and other networks is that 3GPP standards do not allow producer NFs to specify different priorities for different localities and serving scopes in their NF profiles. NF producers can publish, in separate attributes, their details (e.g. priority, locality, servingScope) in their profiles, which will be used by the NRF in discovery responses and by SCPs/SEPPs/NFs to perform initial and alternate routing of NF service request. The locality or servingScope, along with priority and capacity attributes, helps SCPs/SEPPs/NFs to select a producer NF for a given service request. However, because the locality, servingScope, and priority attributes are distinct attributes, 3GPP standards rely on the consumer NF or SCP to implement the processing logic to use these attributes to perform producer NF selection. In addition, the 3GPP-defined NF profile structure does not allow setting up different priorities for different servingScopes and localities in NF profiles. The priority attribute is separate from the locality and serving scope attributes, and the 3GPP NF profile definition includes only a single locality attribute, a single servingScope attribute, and a single priority attribute.

Figure 3:
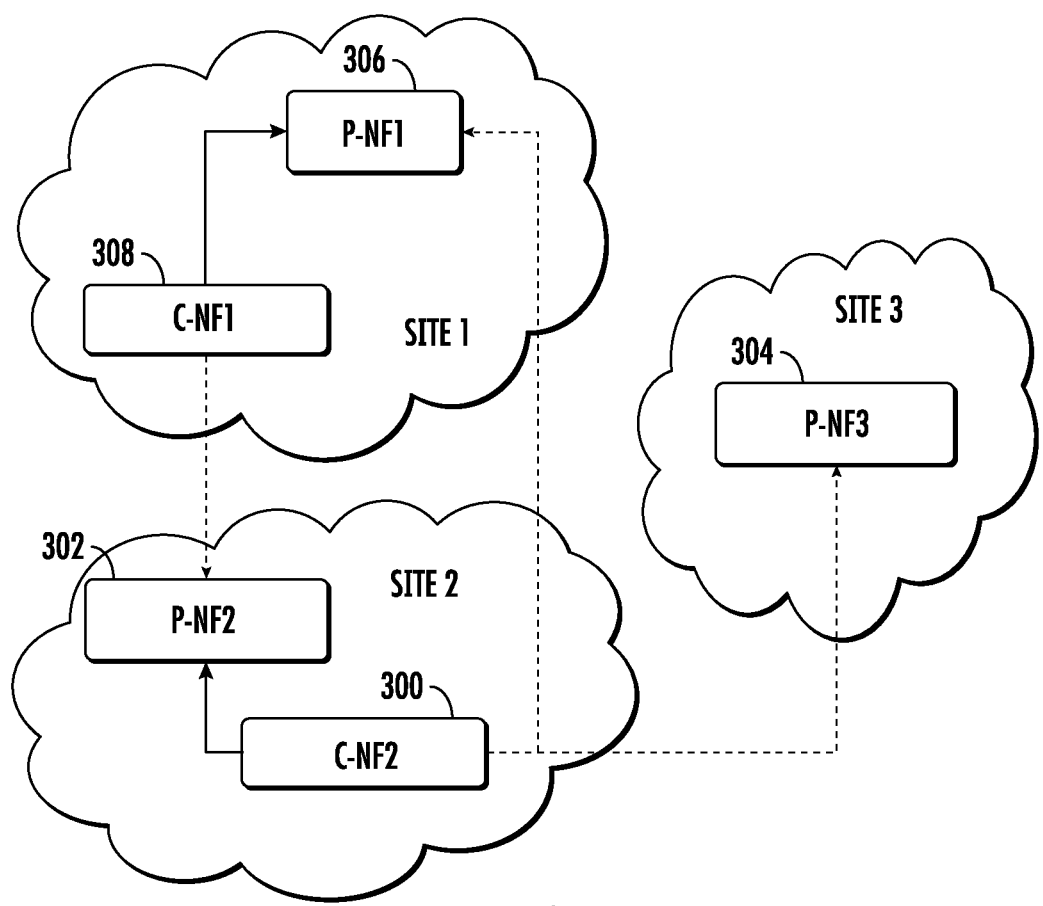
FIG. 3 is a network diagram illustrating producer NFs having different localities and serving scopes and problems associated with prioritizing routing among the producer NFs.

It may be desirable to define multiple serving scopes, localities, and associated priorities in an NF profile. For example, in FIG. 3, for consumer NF2 300 in site2, producer NF2 302 is most preferred (lowest in priority attribute value), followed by producer NF3 304, and then producer NF1 306. For consumer NF1 308 in site1, producer NF1 306 is more preferred than producer NF2 302 in site 2. While such priority can be defined at each consumer NF, doing so at the consumer NF level is cumbersome and inefficient.

Challenges with the 3GPP model for an NF profile include the fact that a producer NF is not able to publish different priorities for different localities. The NF profile can have a single locality at the NF profile level and a priority at the NF profile level. As a result, the priority at the NF profile level applies to the single locality. One way to implement different priorities for different localities would be for producer NF2 302 to publish priority 0 for a locality of site 2 and priority of 1 for the locality of site 1. However, current 3GPP standards do not provide a mechanism for producer NFs to publish different priorities for different localities.

A producer NF is likewise not able to publish different priorities for different servingScopes. The NF profile allows the producer NF to specify an array of servingScope attribute values, but the current 3GPP-defined NF profile structure does not allow the producer NF to specify a priority for each servingScope attribute value. For example, producer NF2 302 may need to publish a priority of 0 for site2 as the servingScope and priority of 2 for site1 as the servingScope. Thus, there is a need or a solution to this problem in an operator's network.

Possible solutions for enabling different priorities for different localities and serving scopes include:
Option 1: Configure consumer NFs/SCPs/SEPPs to have static mappings of priorities for localities or servingScopes of producer NFs.
Option 2: Have producer NFs create multiple NF profiles and specify different localities/servingScopes and priorities in the respective NF profiles for registration.

Option 1 requires every consumer NF/SCP/SEPP to be configured with the priorities associated with the different localities and serving scopes. Option 1 is not technically feasible because an operator may have NFs from multiple vendors and implementing custom configurations on NFs from different vendors may be challenging. Option 2 requires all producer NFs to support multiple NF profiles, which may also present technical challenges. Registering multiple NF profiles per producer NF not only has maintainability issues, but also increases the processing load on the NRF during NF discovery and other procedures.

Instead of configuring each consumer NF/SCP/SEPP with priorities for different localities and serving scopes or requiring producer NFs to register multiple NF profiles, the subject matter described herein allows producer NFs to publish additional sets of localities/servingScopes to "priority" mappings in the NF profile as vendor-specific extension data. Vendor-specific extension data is defined in section 6.6.3 of 3GPP TS 29.500.

In one example, the subject matter described herein is implemented at the NRF where the NRF allows a producer NF to register a locality set and a serving scope set, respectively containing locality and servingScope attribute values that are separate from the NF profile level locality and servingScope attribute values in the NF profile. The locality set and servingScopeSet each include priority values that map to each of the locality and servingScope attribute values in the localitySet and servingScopeSet. The priority attribute values specified for the locality and servingScope sets are separate from the NF profile level priority attribute value of the NF profile. When the NRF receives an NF discovery request with a preferred locality attribute, the NRF locates all NF profiles with a matching the NF profile level locality in the NF profile or with a locality specified in the locality set of the vendor-specific extensions of the NF profile. The NRF may adjust the value of the NF profile level priority attribute as follows as follows:

For NF profiles selected due to locality information in vendor-specific extensions, consider that corresponding priority of locality in locality set as the NF profile level priority.

Run operator policy (if any) to adjust priority of NF profiles being returned to consumer NFs/SCP/SEPP.

When an NF discovery request has a servingScope attribute, the NRF may perform the following:

Find all NF profiles with matching the NF profile level servingScope or with serving scope specified in the servingScopeSet of vendor-specific extensions of the NF profile Adjust the priorities of the NF profile as follows:
For NF profiles selected due to servingScope information in vendor-specific extensions, consider corresponding priority of the matching servingScope in servingScopeSet as the NF profile level priority.

Run operator policy (if any) to adjust the priorities of NF profiles being returned to consumer NFs/SCP/SEPP.

The following are data structure definitions of the localitySet and servingScopeSet that may be provided recognized by the NRF as new NF profile attributes:

"vendorSpecific-000111": {
  "localitySet": [
    "locality1": 1,
    "locality2": 2,
  ],
  "servingScopeSet": [
    "area1": 1,
    "area2": 2,
  ]

In the data structure definition for the localitySet, the producer NF can specify multiple locality attribute values and corresponding priority values. Similarly, in the data structure definition for the servingScopeSet, the producer NF can specify multiple serving scope attribute values and corresponding priority values.

In the example above, the NRF compares preferred-locality and servingScope attributes from NF discovery requests to the attribute values in the localitySet and the servingScopeSet and sets the NF profile level priorities of the NF profiles based on the priorities of matching attribute values in the localitySet and the servingScopeSet. In an alternate implementation of the subject matter described herein, the SCP or SEPP obtain NF profiles from the NRF, identify NF profiles having localitySet or servingScopeSet attribute values matching a preferred locality or servingScope attribute value specified by a consumer NF, and adjust the NF profile level priorities of the NF profiles based on the priorities of the matching attribute values in the localitySet and the servingScopeSet. For initial routing using 3GPP-defined communications model D and alternate routing using 3GPP communications model C or D and if locality information is configured at SCP or SEPP, then the SCP or SEPP may:

Fetch all or a subset of the NF profiles from the NRF (This can be done offline by subscribing to all NF profiles at the NRF) In one example, the SCP or SEPP may fetch a copy of the entire NF profiles database from the NRF. In another example, the SCP or SEPP may fetch a subset of the NF profiles in the NF profiles database, where the subset includes NF profiles that match query parameters in an NF service or NF discovery request.

Select the NF profiles that have a matching locality attribute value in either the NF profile level locality attribute or a locality attribute in the localitySet of the vendor-specific extensions of the NF profile. The SCP or SEPP may also apply an operator policy to remove NF profiles based on load or other criteria.

Sort the profiles based on priority from the following:
Profiles selected due to matching locality from the NF profile, use the NF profile level priority of the NF profile as the priority of the NF profile.

Profiles selected due to matching a locality attribute value specified in a localitySet of the vendor-specific extensions of the NF profile, the corresponding priority from vendor-specific extensions Route to the first producer NF in sorted list.

For initial routing in model D and alternate routing in model C/D and if servingScope information is configured at SCP or SEPP then the SCP or SEPP may:

Fetch all or a subset (described above) of the or NF profiles from NRF. Selecting all of the NF profiles can be done offline by subscribing to all of the NF profiles registered with the NRF.

Select profile that has a servingScope matching either the NF profile level serving scope attribute or a servingScope attribute in the servingScopeSet of vendor-specific extensions of the NF profile. The NRF may apply operator policy to remove profiles based on load or other criteria.

Sort the profiles based on priority from the following:
Profiles selected due to matching servingScope from the NF profile, use the NF profile level priority of the NF profile as the priority of the NF profile Profiles selected due to servingScopeSet of vendor-specific extensions of the NF profile, use the corresponding priority from vendor-specific extensions as the priority of the NF profile.

Route the NF service request to the first producer NF in sorted list.

Figure 4:
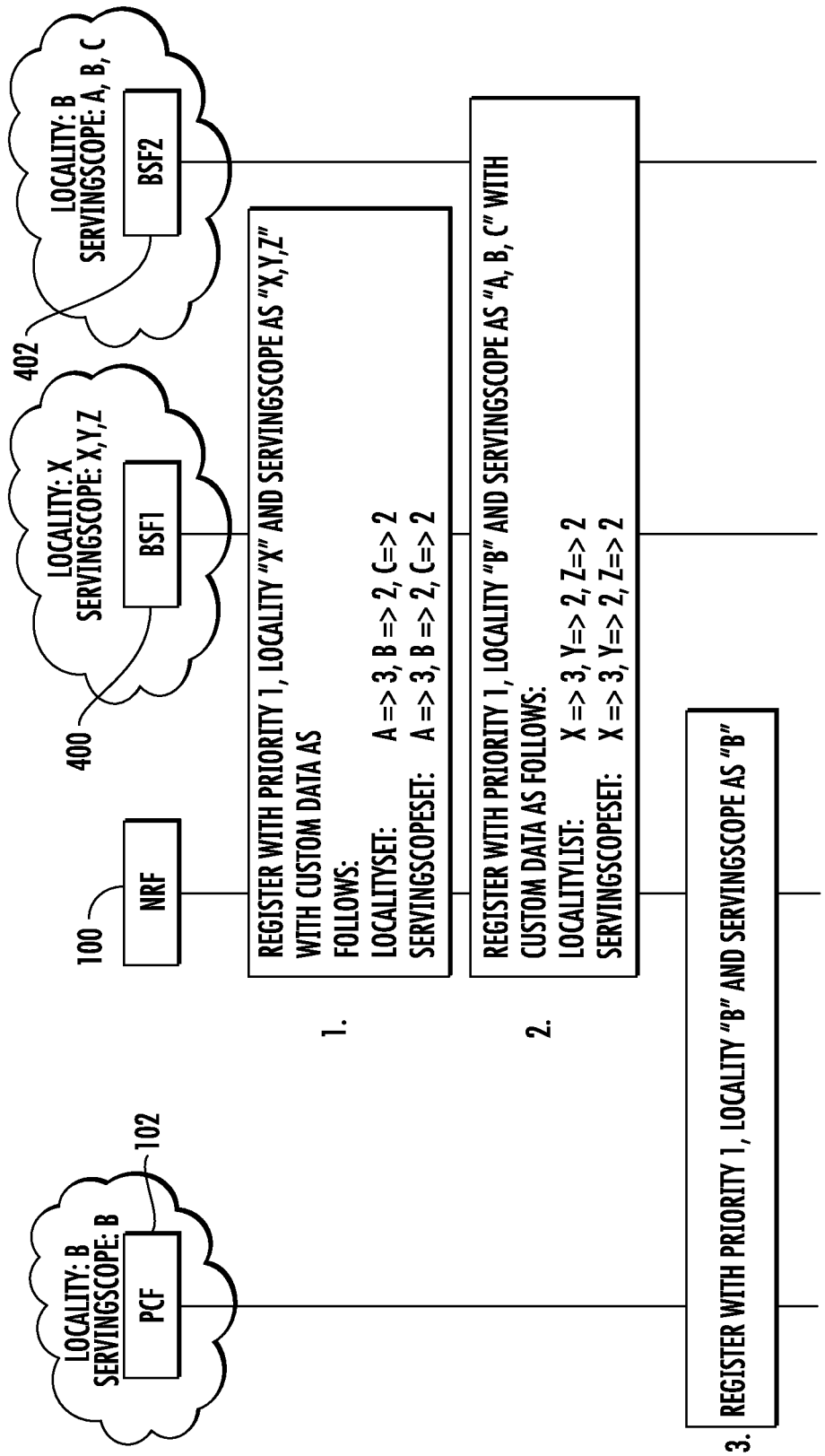
FIG. 4 is a message flow diagram illustrating exemplary messages exchanged in NF registration where a producer NF registers a locality set and a serving scope set respectively including a plurality of locality attribute values and a plurality of serving scope attribute values as well as corresponding priority attribute values.

FIG. 4 is a message flow diagram illustrating exemplary messages exchanged in registering NF profiles, some of which include a localitySet and a servingScopeSet, with the NRF. Referring to FIG. 4, in line 1, Binding Support Function #1 (BSF1) 400 registers its NF profile with NRF 100. The NF profile of BSF1 400 includes an NF profile level priority of 1, an NF profile level locality attribute value of X, NF profile level servingScope attribute values of X, Y, and Z, a localitySet attribute with localitySet level locality attribute values A, B, and C and localitySet level priorities of 3, 2, and 2, respectively, and a servingScopeSet attribute with servingScopeSet level attribute values of A, B, and C and servingScopeSet level priorities of 3, 2, and 2, respectively. The NF profile may also include other attributes, e.g., NF type, capacity, etc., which are not shown in FIG. 4. In line 2, BSF2 402 registers its NF profile with NRF 100. The NF profile includes an NF profile level priority of 1, an NF profile level locality attribute value of B, an NF profile level servingScope attribute values of X, Y, and Z, a localitySet attribute with localitySet level locality attribute values X, Y, and Z and localitySet level priorities of 3, 2, and 2, respectively, and a servingScopeSet attribute with servingScope set level attribute values of A, B, and C and servingScope set level priorities of 3, 2, and 2, respectively. The NF profile may also include other attributes, e.g., NF type, capacity, etc., which are not shown in FIG. 4. In line 3, PCF 102 registers its NF profile with NRF 100. The NF profile includes an NF profile level priority attribute value of 1, an NF profile level locality attribute value of B, and an NF profile level servingScope attribute value of B.

Figure 5:
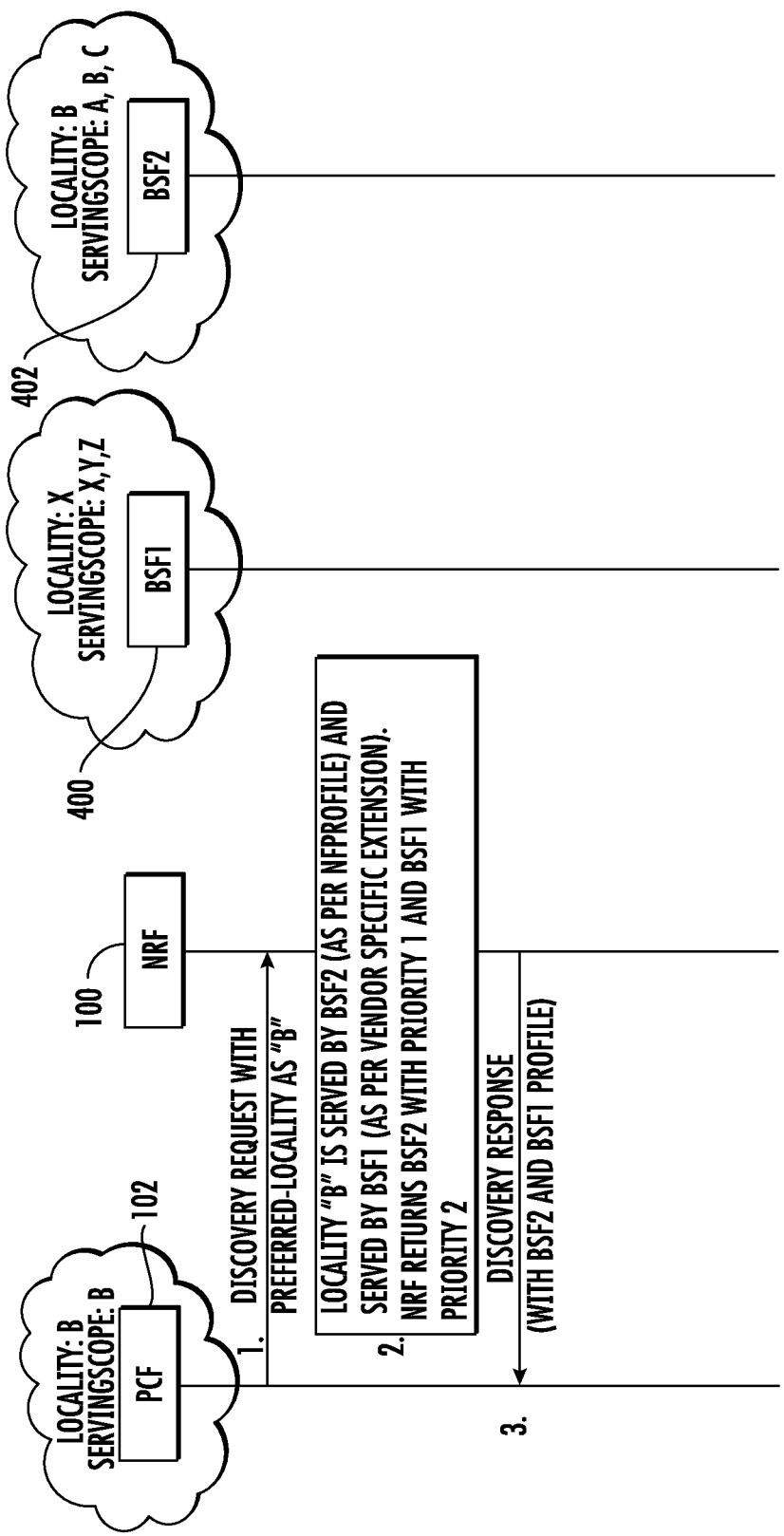
FIG. 5 is a message flow diagram illustrating exemplary messages exchanged when an NRF uses the priorities specified for locality attribute values in locality sets to prioritize NF profiles in discovery responses returned to an NF.

FIG. 5 is a message flow diagram illustrating exemplary messages exchanged where the NRF sets priorities of NF profiles using priorities specified in a localitySet when an NF discovery request includes a preferred-locality attribute. Referring to FIG. 5, in line 1, PCF 102 sends an NF discovery request with a preferred-locality attribute having a value of "B" to NRF 100. In line 2, NRF 100 locates NF profiles that match query parameters in the discovery request, and, from those NF profiles, identifies NF profiles with an NF profile level locality attribute value of locality B or a locality attribute value in a localitySet with a locality attribute value of locality B. In this example, BSF2 402 has an NF profile level locality attribute value of locality B, and BSF1 400 has a locality set with a locality attribute value of locality B and a corresponding priority of 2. Accordingly, NRF 100 returns the NF profile of BSF2 402 with an NF profile level priority of 1 and the NF profile of BSF1 400 with an NF profile level priority of 2 (modified based on the localitySet priority for locality B). In the examples described herein, higher numeric priority values indicate that the NF is less preferred than lower numeric priority values.

Figure 6:
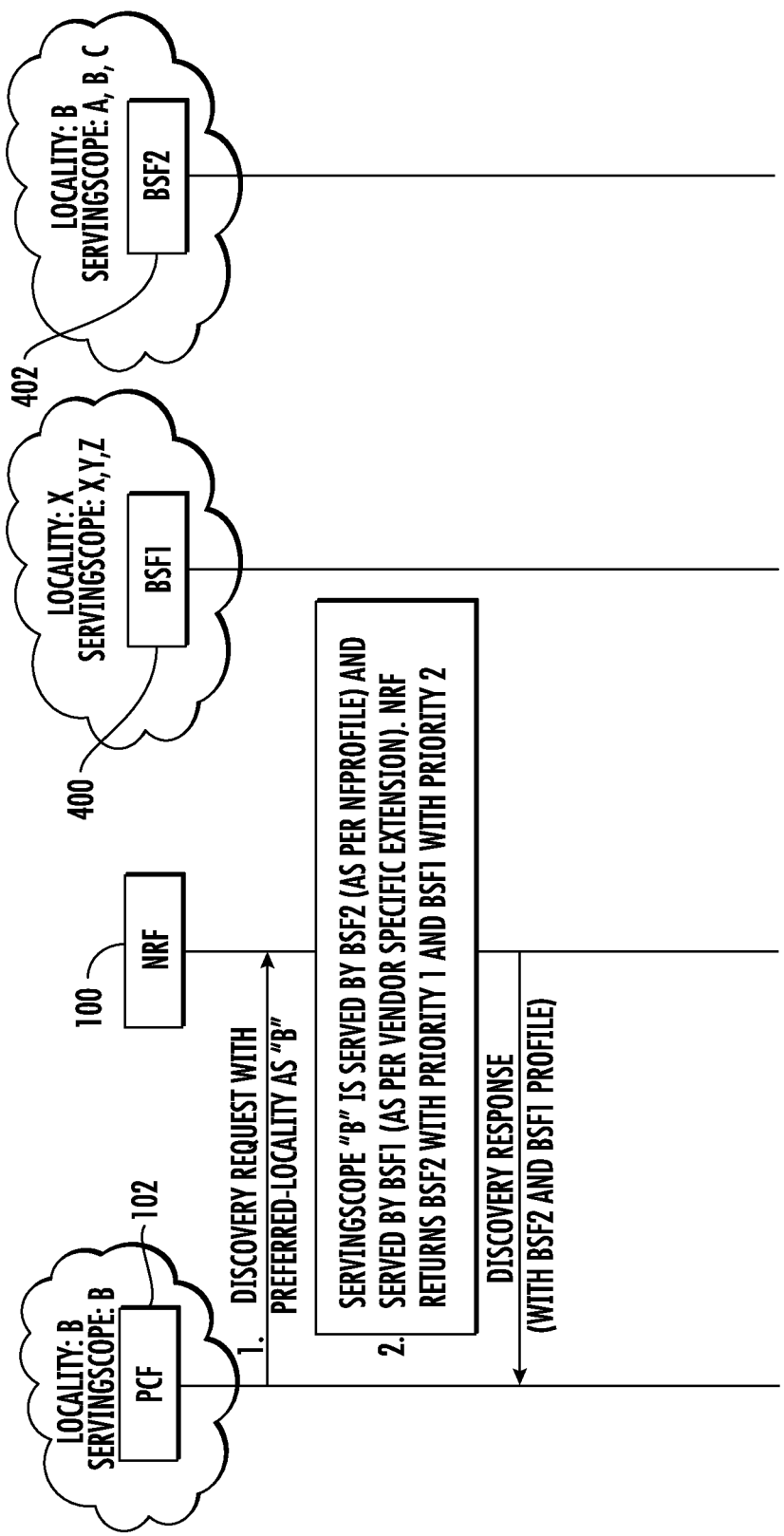
FIG. 6 is a message flow diagram illustrating exemplary messages exchanged when an NRF uses the priorities specified for servingScope attribute values in servingScopeSets to prioritize NF profiles in discovery responses returned to an NF.

FIG. 6 is a message flow diagram illustrating exemplary messages exchanged where the NRF sets priories of NF profiles using priorities specified in a servingScopeSet when an NF discovery request includes a servingScope attribute. Referring to FIG. 6, in line 1, PCF 102 sends an NF discovery request with a serving-scope attribute having a value of "B" to NRF 100. In line 2, NRF 100 locates NF profiles that match query parameters in the discovery request, and, from those NF profiles, identifies NF profiles with an NF profile level servingScope attribute value of servingScope B or a servingScope attribute value in a servingScopeSet with a servingScope attribute value of servingScope B. In this example, BSF2 402 has an NF profile level servingScope attribute value of servingScope B, and BSF1 400 has a servingScopeSet with a servingScope attribute value of servingScope B and a corresponding priority of 2. Accordingly, NRF 100 returns the NF profile of BSF2 402 with an NF profile level priority of 1 and the NF profile of BSF1 400 with an NF profile level priority of 2 (modified based on the servingScope set priority for servingScope B).

Figure 7:
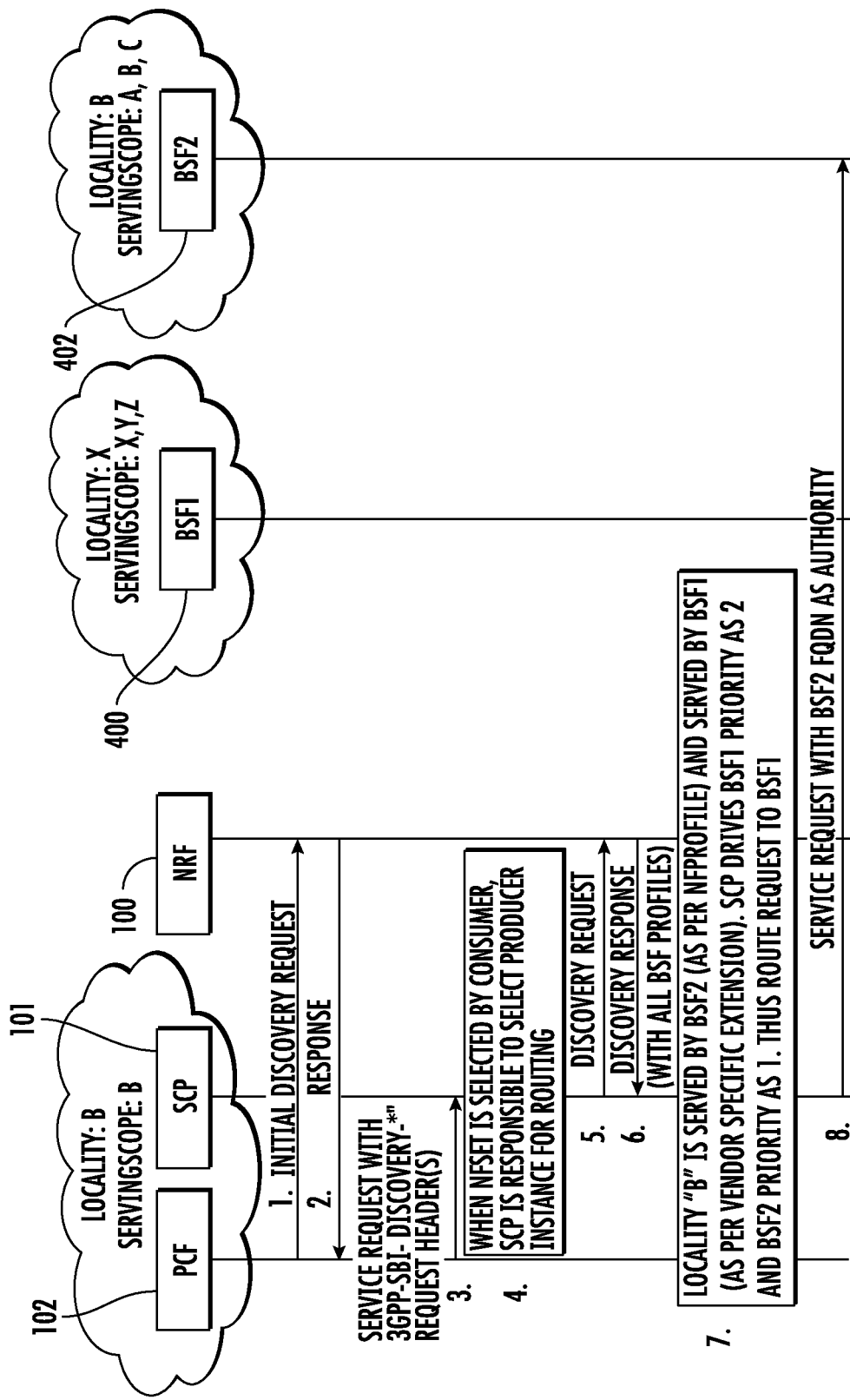
FIG. 7 is a message flow diagram illustrating exemplary messages exchanged when an SCP uses the priorities specified for locality attribute values in locality sets to prioritize NF profiles, select a producer NF, and initially route an NF service request using 3GPP communications model C.

FIG. 7 is a message flow diagram illustrating exemplary messages exchanged where an SCP uses localities specified in a localitySet to prioritize NF profiles and route an initial NF service request to a producer NF according to 3GPP communications model C (indirect routing via an SCP without delegated discovery). Referring to FIG. 7, In line 1, PCF 102 sends an initial NF discovery request to NRF 100. NRF 100 locates NF profiles of producer NFs capable of providing the service requested by the NF discovery request. In line 2, NRF 100 sends an NF discovery response to PCF 102 with the NF profiles. In line 3, PCF 102 sends an SBI service request with 3GPP-sbi-Discovery request headers. The discovery request headers may identify an NF set. Because the discovery request headers identify an NF set, in line 4, SCP 101 determines that it is responsible for selecting a producer NF instance within the NF set for routing. In line 5, SCP 101 sends an NF discovery request to NRF 100 to discover NF instances within the NF set available to provide the service requested by the SBI service request. In line 6, NRF 100 responds with the NF profiles of the NF instances, which in this example includes the NF profiles of BSF1 400 and BSF2 402. In line 7, SCP 101 uses locality B, i.e., the locality of PCF 102 obtained from the SBI service request in line 3, to determine the priorities of the NF profiles of BSF1 400 and BSF2 402. SCP 101 determines that BSF2 402 serves locality B according to the NF profile level locality attribute value and that BSF1 400 serves locality B as per the localitySet with a locality attribute value of locality B with priority 2. Accordingly, SCP 101 sets the priority of BSF2 402 to 1, sets the priority of BSF1 400 to 2 and routes the service request to BSF2 402.

Figure 8:
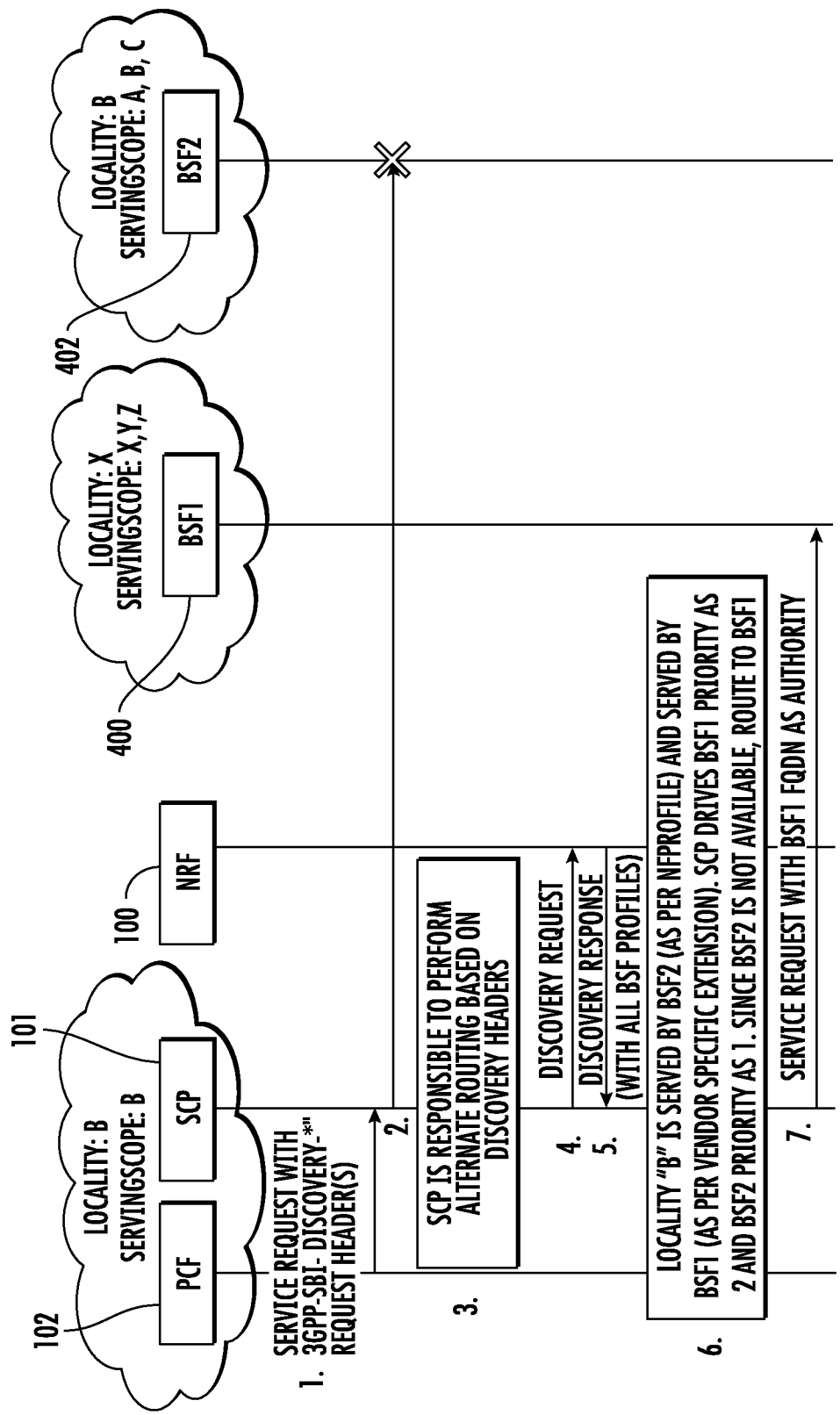
FIG. 8 is a message flow diagram illustrating exemplary messages exchanged when an SCP uses the priorities specified for locality attribute values in locality sets to prioritize NF profiles, select a producer NF, and perform alternate routing of an NF service request using 3GPP communications model C.

FIG. 8 is a message flow diagram illustrating exemplary messages exchanged where an SCP uses localities specified in a localitySet to prioritize NF profiles for alternate routing of an NF service request to a producer NF according to 3GPP communications model C. Referring to FIG. 8, In line 1, PCF 102 sends an SBI service request with 3gpp-Sbi-Discovery or 3gpp-Sbi-Routing-Binding request headers to SCP 101. The discovery request headers may identify an NF set. SCP 101 is assumed to have previously performed discovery with NRF to obtain the NF profiles of BSF1 400 and BSF2 402 and selects BSF2 402 based on the NF profile level locality attribute. In line 2, SCP 101 forwards the SBI service request to BSF2 402. BSF2 402 is unable to process the SBI service request and does not respond.

In line 3, SCP 101 determines, based on the NF discovery request headers or Routing binding headers, that it is responsible for alternate routing of the service request. Accordingly, in line 4, SCP 101 sends an NF discovery request to NRF 100.

In line 5, NRF 100 responds with NF profiles of NFs matching the query parameters in the NF discovery request, which in this example includes the NF profiles of BSF1 400 and BSF2 402. In line 6, SCP 101 uses locality B, i.e., the locality of PCF 102 to determine the priorities of the NF profiles of BSF1 400 and BSF2 402. SCP 101 determines that BSF2 402 serves locality B according to the NF profile level locality attribute value and that BSF1 400 serves locality B as per the localitySet with a locality attribute value of locality B with priority 2. Accordingly, SCP 101 sets the priority of BSF2 402 to 1 and sets the priority of BSF1 400 to 2. However, because BSF2 402 is unavailable, SCP 101 forwards the SBI request to BSF1 400 as the next highest priority producer NF.

Figure 9:
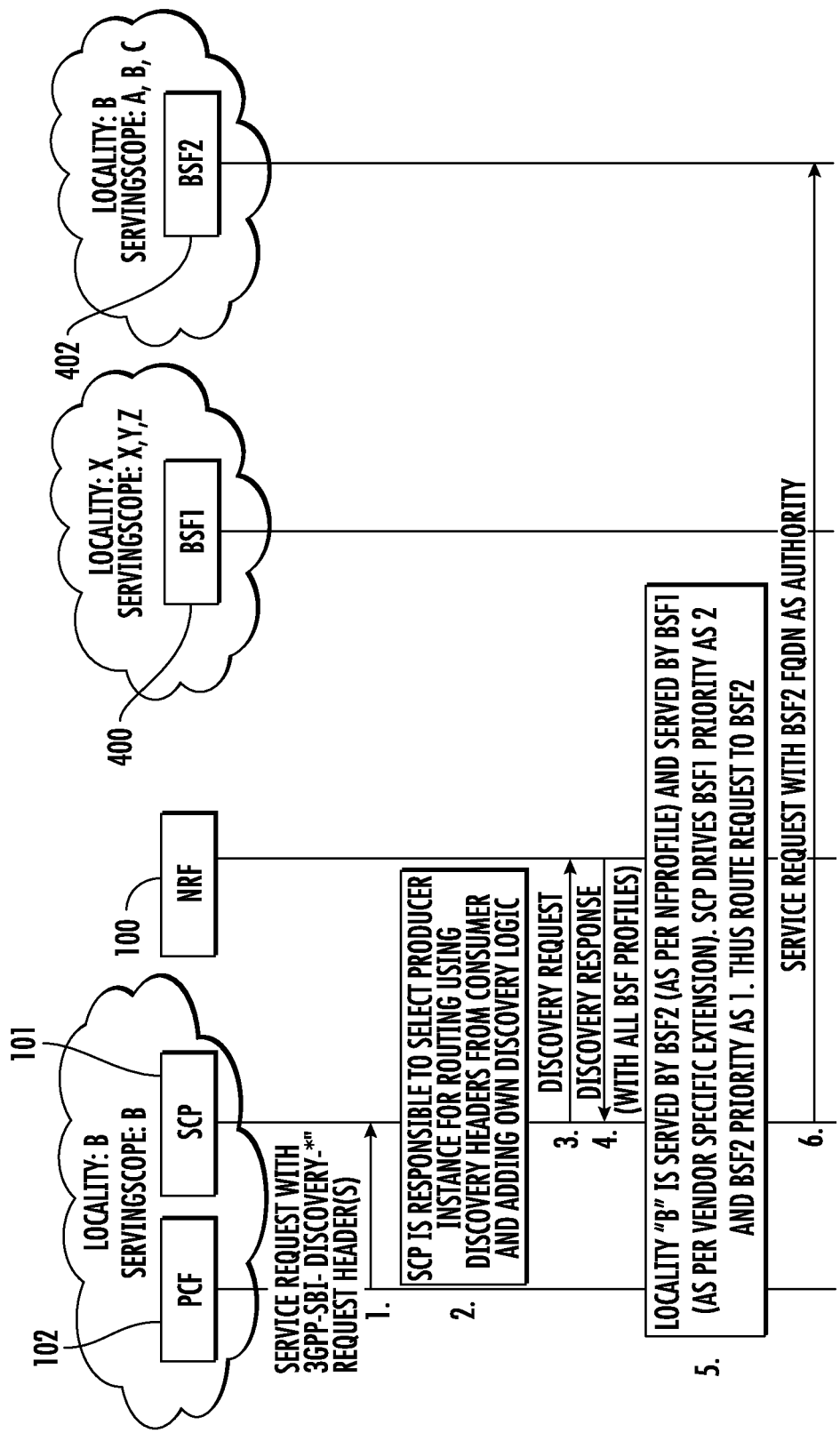
FIG. 9 is a message flow diagram illustrating exemplary messages exchanged when an SCP uses the priorities specified for locality attribute values in locality sets to prioritize NF profiles, select a producer NF, and initially route an NF service request using 3GPP communications model ID.

FIG. 9 is a message flow diagram illustrating exemplary messages exchanged for locality based producer NF selection for routing of an initial SBI request using 3GPP communications model D (indirect routing via an SCP with delegated discovery). Referring to FIG. 9, In line 1, PCF 102 sends an SBI service request with 3gpp-Sbi-Discovery discovery request headers to SCP 101. In line 2, SCP 101 determines that it is responsible for performing NF discovery on behalf of PCF 102 using the 3gpp-sbi-Discovery request headers provided by PCF 102. In line 3, SCP 101 sends an NF discovery request to NRF 100. NRF 100 locates NF profiles of producer NFs capable of providing the service requested by the NF discovery request. In line 4, NRF 100 sends an NF discovery response to PCF 102 with the NF profiles of BSF1 400 and BSF2 402. In line 5, SCP 101 uses locality B, i.e., the locality of PCF 102, to determine the priorities of the NF profiles of BSF1 400 and BSF2 402. SCP 101 determines that BSF2 402 serves locality B according to the NF profile level locality attribute value and that BSF1 400 serves locality B as per the localitySet with a locality attribute value of locality B with priority 2. Accordingly, SCP 101 sets the priority of BSF2 402 to 1, sets the priority of BSF1 400 to 2, and routes the service request to BSF2 402.

Figure 10:
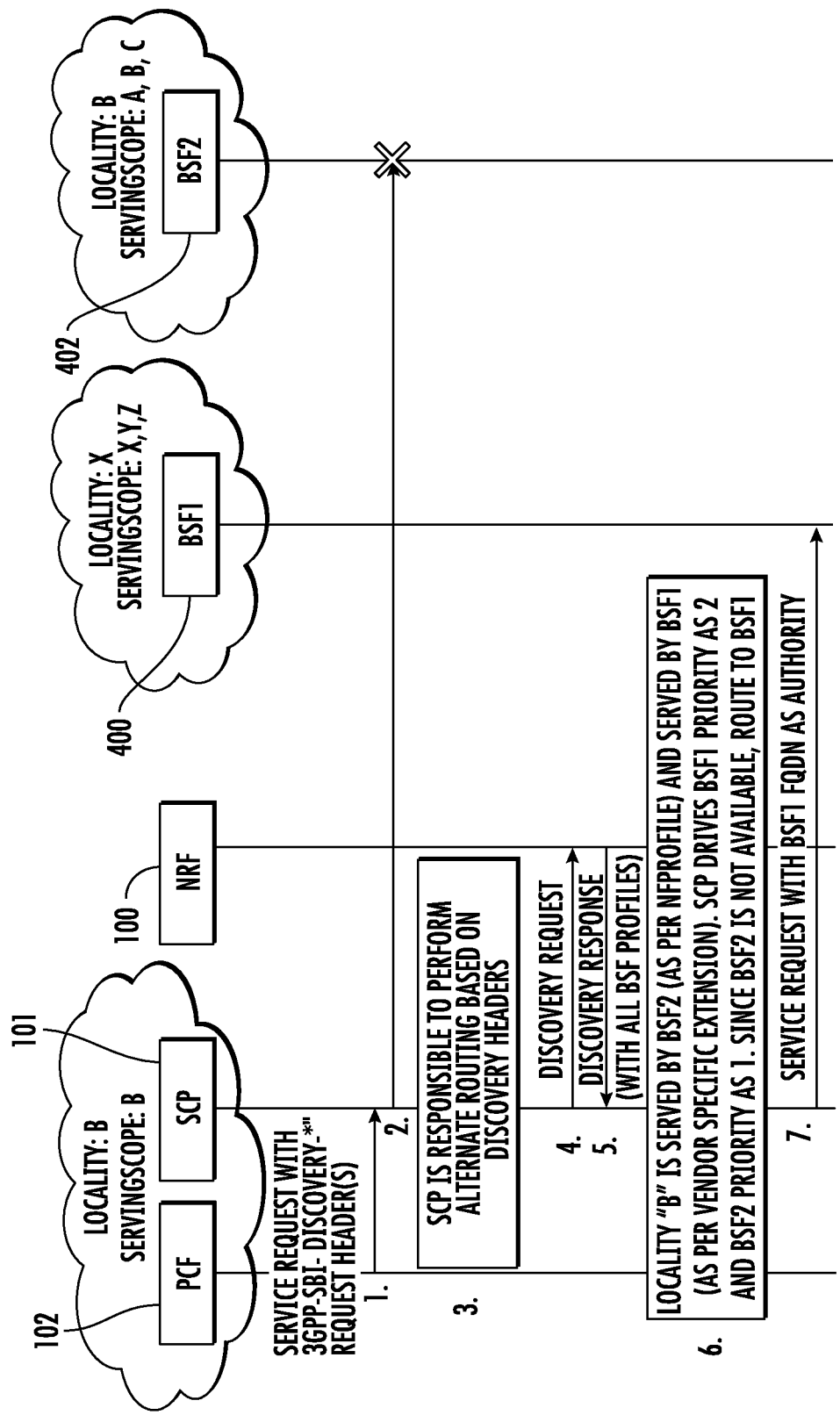
FIG. 10 is a message flow diagram illustrating exemplary messages exchanged when an SCP uses the priorities specified for locality attribute values in locality sets to prioritize NF profiles, select a producer NF, and perform alternate routing of an NF service request using 3GPP communications model D.

FIG. 10 is a message flow diagram illustrating exemplary messages exchanged when an SCP uses the priorities specified for locality attribute values in locality sets to prioritize NF profiles, select a producer NF, and perform alternate routing an NF service request using 3GPP communications model D. Referring to FIG. 10, In line 1, PCF 102 sends an SBI service request with 3gpp-sbi-Discovery request headers or 3gpp-Sbi-Routing-Binding header to SCP 101. SCP 101 is assumed to have previously performed NF discovery with NRF to obtain the NF profiles of BSF1 400 and BSF2 402 and selects BSF2 402 based on the NF profile level locality attribute. In line 2, SCP 101 forwards the SBI service request to BSF2 402. BSF2 402 is unable to process the SBI service request and does not respond.

In line 3, SCP 101 determines, based on the NF discovery or Routing binding request headers, that it is responsible for alternate routing of the NF discovery request. Accordingly, in line 4, SCP 101 sends an NF discovery request to NRF 100.

In line 5, NRF 100 responds with NF profiles of NFs matching the query parameters in the NF discovery request, which in this example includes the NF profiles of BSF1 400 and BSF2 402. In line 6, SCP 101 uses locality B, i.e., the locality of PCF 102, to determine the priorities of the NF profiles of BSF1 400 and BSF2 402. SCP 101 determines that BSF2 402 serves locality B according to the NF profile level locality attribute value and that BSF1 400 serves locality B as per the localitySet with a locality attribute value of locality B with priority 2. Accordingly, SCP 101 sets the NF profile level priority of BSF2 402 to 1 and sets the NF profile level priority of BSF1 400 to 2. However, because BSF2 402 is unavailable, in line 7, SCP 101 forwards the SBI request to BSF1 400 as the next highest priority producer NF.

Although in FIGS. 7-10, an SCP uses the values of locality attributes in the localitySet to prioritize NF profiles of producer NFs, the subject matter described herein is not limited to an SCP performing the actions in FIG. 7-10. In an alternate example, an SEPP may perform the actions performed by SCP 101 illustrated in FIGS. 7-10. In addition, in FIGS. 7-10, SCP 101 uses locality and localitySet attributes to prioritize NF profiles of producer NFs. In an alternate implementation, SCP 101 or SEPP 126 may use servingScope and servingScopeSet attributes to prioritize the NF profiles.

Figure 11:
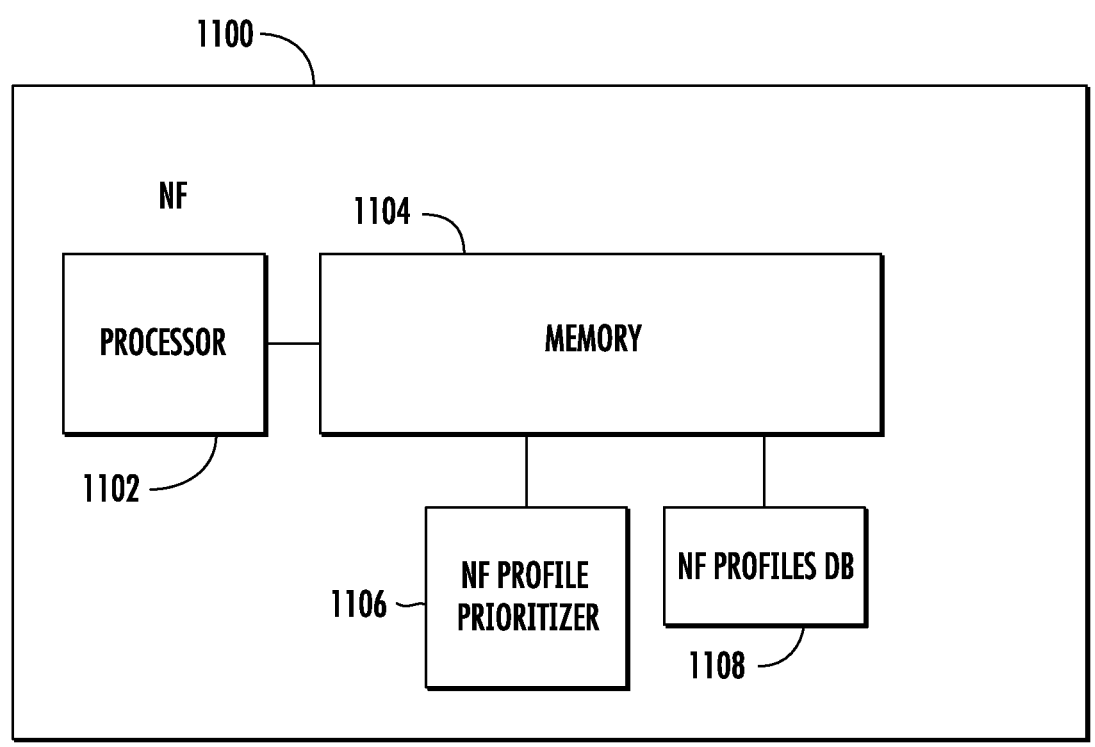
FIG. 11 is a block diagram illustrating an exemplary NF for performing is a flow chart illustrating an exemplary process for locality and serving scope set based NF profile prioritization and message routing.

FIG. 11 is a block diagram illustrating an exemplary network node configured to use producer NF localitySet and servingScopeSet attributes to prioritize NF profiles of producer NFs and, in the case where the network node is an SCP or SEPP, to route SBI request messages to selected producer NFs. Referring to FIG. 11, an NF 1100 includes at least one processor 1102 and a memory 1104. NF 1100 may be an NRF, an SCP, or an SEPP. NF 1100 incudes an NF profiles prioritizer 1106 that prioritizes NF profile of producer NFs based on NF profile level locality attributes, NF profile level servingScope attributes, locality attributes in localitySets, and servingScope attributes in servingScopeSets. NF 1100 may also include an NF profiles database 1108, which in the case where NF 1100 is an NRF, includes all of the NF profiles that are registered with the NRF. In the case where NF 1100 is an SCP or SEPP, NF profiles database 1108 may be a copy of all or a subset of the NF profiles database maintained by the NRF. NF profile prioritizer 1106 may be implemented using computer executable instructions stored in memory 1104 and executable by processor 1102.

Figure 12:
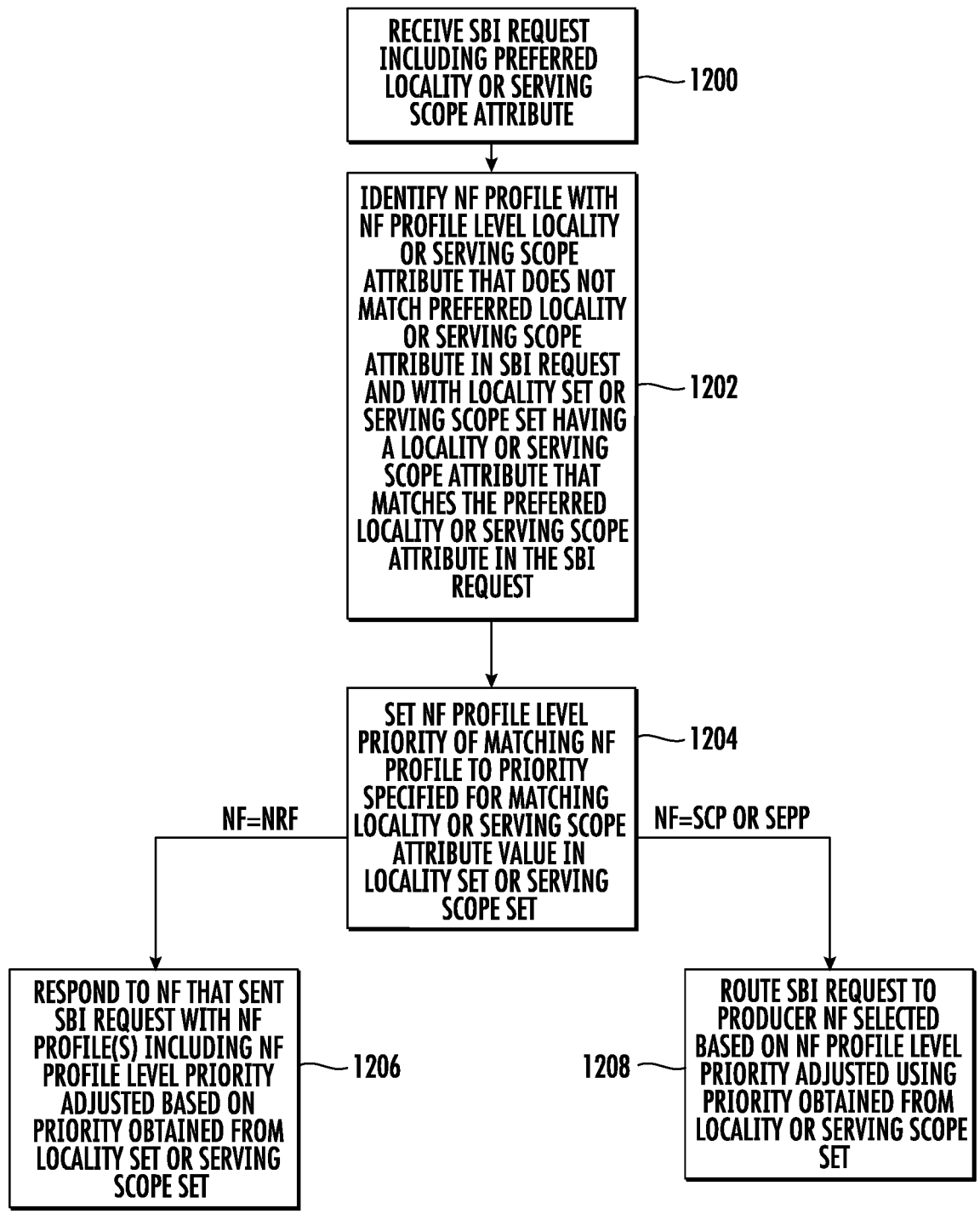
FIG. 12 is a flow chart illustrating an exemplary process for locality and serving scope set based NF profile prioritization and message routing.

FIG. 12 is a flow chart illustrating an exemplary process for locality and serving scope set based NF profile prioritization and message routing. Referring to FIG. 11, in step 1200, the process includes receiving a service based interface (SBI) request including a preferred locality or a servingScope attribute. For example, if NF 1100 is an NRF, the SBI request may be an NF discovery request with a preferred locality attribute or a servingScope attribute. If NF 1100 is an SCP or SEPP, the SBI request may be an SBI service request with a 3gpp-sbi-Discovery header including a preferred locality or servingScope attribute.

In step 1202, the process includes identifying an NF profile of a producer NF with an NF profile level locality or servingScope attribute that does not match the preferred locality or servingScope attribute in the SBI request and with a localitySet or servingScopeSet having a locality servingScopeSet attribute that matches the preferred locality or servingScope attribute in the SBI request. For example, if the SBI request is an NF discovery or NF service request with a preferred locality attribute, NF 1100 may determine that the preferred locality attribute does not match the NF profile level locality attribute of an NF profile but that the preferred locality attribute matches a locality attribute in a localitySet of the NF profile. If the SBI request is an NF discovery or NF service request with a servingScope attribute, NF 1100 may determine that the servingScope attribute does not match the NF profile level servingScope attribute of an NF profile but that the servingScope attribute matches a servingScope attribute in a servingScopeSet of the NF profile.

In step 1204, the process includes setting an NF profile level priority of the NF profile based on a priority specified for the matching locality attribute in the localitySet or the servingScope attribute in the servingScopeSet. For example, NF 1100 may set the NF profile level priority attribute of the NF profile with a matching locality or servingScopeSet attribute to the priority specified for the locality or servingScope attribute in the localitySet or servingScopeSet.

If NF is an NRF, control proceeds to step 1206, where the process includes responding to the node that sent the SBI request with the NF profile(s), including their localitySet or servingScopeSet adjusted NF profile level priority values. If NF 1100 is an SCP or SEPP, control proceeds to step 1208, where the process routing the SBI request message based on the priority specified for the locality or servingScope attribute in the localitySet or servingScopeSet.

The disclosure of each of the following references is incorporated herein by reference in its entirety.

REFERENCES 1. 3$^{rd}$ Generation Partnership Project; Technical Specification Group Core Network and Terminals; Technical Realization of Service Based Architecture (5GS), Stage 3 (Release 17) 3GPP TS 29.500 V17.4.0 (2021-09)
2. 3$^{rd}$ Generation Partnership Project; Technical Specification Group Services and System Aspects; System Architecture for the 5G System (5GS), Stage 2 (Release 17) 3GPP TS 23.501 V17.2.1 (2021-09)
3. 3$^{rd}$ Generation Partnership Project; Technical Specification Group Core Network and Terminals; 5G System; Network Function Repository Services; Stage 3 (Release 17) 3GPP TS 29.510 V17.3.0 (2021-09)
4. 3$^{rd}$ Generation Partnership Project; Technical Specification Group Services and System Aspects; Security architecture and procedures for 5G System (5GS) (Release 17) 3GPP TS 33.501 V17.3.0 (2021-09)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for locality and serving scope set based network function (NF) profile prioritization and message routing, the method comprising:
   at an NF including at least one processor:
      receiving a service based interface (SBI) request including a preferred locality attribute value or a servingScope attribute value;
      identifying an NF profile of a producer NF with an NF profile level locality attribute value that does not match the preferred locality attribute value in the SBI request or a servingScope attribute value that does not match the servingScope attribute value in the SBI request, wherein the NF profile includes a localitySet and a servingScopeSet, the localitySet is an NF profile attribute that is separate from the NF profile level locality attribute value, the servingScopeSet is an NF profile attribute separate from the NF profile level servingScope attribute value, the localitySet includes a plurality of locality attribute values and corresponding priority values, and the servingScopeSet includes a plurality of servingScope attribute values and corresponding priority values;
      when the SBI request includes a preferred locality attribute value that does not match the NF profile level locality attribute value and that matches one of the locality attribute values in the localitySet, setting an NF profile level priority of the NF profile based on the priority value specified for the matching locality attribute value in the localitySet; and
      when the SBI request includes a servingScope attribute value that does not match the NF profile level servingScope attribute value and that matches one of the servingScope attribute values in the servingScopeSet, setting the NF profile level priority of the NF profile based on the priority of the matching servingScope attribute value in the servingScopeSet.

2. The method of claim 1 wherein the NF comprises an NF repository function (NRF), receiving an SBI request includes receiving an NF discovery request including the preferred locality attribute value, identifying the NF profile includes identifying the NF profile with the localitySet where one of the locality attribute values in the localitySet matches the preferred locality attribute value in the NF discovery request, and setting the NF profile level priority includes replacing a value of the NF profile level priority attribute in the NF profile with the priority value of the matching locality attribute value in the localitySet.

3. The method of claim 1 wherein the NF comprises an NF repository function (NRF), receiving the SBI request includes receiving an NF discovery request including the servingScope attribute, identifying the NF profile includes identifying the NF profile with the servingScopeSet where one of the servingScopeSet attribute values matches the servingScope attribute value in the NF discovery request, and setting the NF profile level priority includes replacing a value of an NF profile level priority attribute in the NF profile with the priority value of the matching servingScope attribute value in the servingScopeSet.

4. The method of claim 1 wherein the NF comprises a service communication proxy (SCP) or a security edge protection proxy (SEPP), receiving the SBI request includes receiving an NF service request including the preferred locality attribute, the method further comprises sending an NF discovery request including the preferred locality attribute to an, receiving an NF discovery response including a plurality of NF profiles, including the NF profile, identifying the NF profile includes identifying the NF profile with the localitySet where one of the locality attribute values that matches the preferred locality attribute in the NF service request, setting the NF profile level priority includes replacing a value of the NF profile level priority attribute in the NF profile with the priority value of the matching locality attribute value in the localitySet and the method further comprises routing the NF service request to the producer NF based on the value of the NF profile level priority attribute.

5. The method of claim 4 wherein routing the NF service request to the producer NF includes routing an initial NF service request to the producer NF.

6. The method of claim 4 wherein routing the NF service request to the producer NF includes performing alternate routing of the NF service request to the producer NF.

7. The method of claim 1 wherein the NF comprises a service communication proxy (SCP) or a security edge protection proxy (SEPP), receiving the SBI request includes receiving an NF service request including the servingScope attribute, the method further comprises sending an NF discovery request including the servingScope attribute to an NRF, receiving an NF discovery response including a plurality of NF profiles, including the NF profile, identifying the NF profile includes identifying the NF profile with the servingScopeSet where one of the servingScope attribute values matches the servingScope attribute in the NF service request, setting the NF profile level priority includes replacing a value of the NF profile level priority attribute in the NF profile with the priority value of the matching servingScope attribute value in the servingScopeSet, and the method further comprises routing the NF service request to the producer NF based on the value of the NF profile level priority attribute.

8. The method of claim 7 wherein routing the NF service request to the producer NF includes routing an initial NF service request to the producer NF.

9. The method of claim 7 wherein routing the NF service request to the producer NF includes performing alternate routing of the NF service request to the producer NF.

10. A system for locality and serving scope set based network function (NF) profile prioritization and message routing, the system comprising:
an NF including at least one processor; and
an NF profile prioritizer implemented by the at least one processor for receiving a service based interface (SBI) request including a preferred locality attribute value or a servingScope attribute value, identifying an NF profile of a producer NF with an NF profile level locality attribute value that does not match the preferred locality attribute value in the SBI request or a servingScope attribute value that does not match a serving scope attribute value in the SBI request, wherein the NF profile includes a localitySet and a servingScopeSet, the localitySet is an NF profile attribute that is separate from the NF profile level locality attribute value, the servingScopeSet is an NF profile attribute separate from the NF profile level servingScope attribute value, the localitySet includes a plurality of locality attribute values and corresponding priority values, and the servingScopeSet includes a plurality of servingScope attribute values and corresponding priority values and the NF profile prioritizer is configured for:
when the SBI request includes a preferred locality attribute value that does not match the NF profile level locality attribute value and that matches one of the locality attribute values in the localitySet, setting an NF profile level priority of the NF profile based on the priority value specified for the matching locality attribute value in the localitySet; and
when the SBI request includes a servingScope attribute value that does not match the NF profile level servingScope attribute value and that matches one of the servingScope attribute values in the servingScopeSet, setting the NF profile level priority of the NF profile based on the priority of the matching servingScope attribute value in the servingScopeSet.

11. The system of claim 10 wherein the NF comprises an NF repository function (NRF), the SBI request comprises an NF discovery request including the preferred locality attribute value, the NF profile prioritizer is configured to identify the NF profile with the localitySet where one of the locality attribute values that in the localitySet matches the preferred locality attribute value in the NF discovery request and the NF profile prioritizer is configured to set the NF profile level priority by replacing a value of the NF profile level priority attribute in the NF profile with the priority value of the matching locality attribute value in the localitySet.

12. The system of claim 10 wherein the NF comprises an NF repository function (NRF), the SBI request includes an NF discovery request including the servingScope attribute value, and the NF profile prioritizer is configured to identify the NF profile with the servingScopeSet where one of the servingScopeSet attribute that values matches the servingScope attribute value in the NF discovery request and the NF profile prioritizer is configured to set the NF profile level priority by replacing a value of an NF profile level priority attribute in the NF profile with the priority value of the matching servingScope attribute value in the servingScopeSet.

13. The system of claim 10 wherein the NF comprises a service communication proxy (SCP) or a security edge protection proxy (SEPP), the SBI request includes an NF service request including the preferred locality attribute value, the SCP or SEPP is configured to send an NF discovery request including the preferred locality attribute value to an NRF and receive an NF discovery response including a plurality of NF profiles, including the NF profile, and the NF profile prioritizer is configured to identify the NF profile with the localitySet where one of the locality attribute values matches the preferred locality attribute value in the NF service request and the NF profile prioritizer is configured to set the NF profile level priority by replacing a value of the NF profile level priority attribute in the NF profile with the priority value of the matching locality attribute in the localitySet and the SCP or SEPP is configured to route the NF service request to the producer NF based on the value of the NF profile level priority attribute.

14. The system of claim 13 wherein the SCP or SEPP is configured to perform initial routing of the SBI service request to the producer NF.

15. The system of claim 13 wherein the SCP or SEPP is configured to perform alternate routing of the SBI service request to the producer NF.

16. The system of claim 10 wherein the NF comprises a service communication proxy (SCP) or a security edge protection proxy (SEPP), the SBI request includes an NF service request including the servingScope attribute value, the SCP or SEPP is configured to send an NF discovery request including the servingScope attribute value to an NRF and receive an NF discovery response including a plurality of NF profiles, including the NF profile, the NF profile prioritizer is configured to identify the NF profile with the servingScopeSet where one of the servingScope attribute values matches the servingScope attribute value in the NF service request and the NF profile prioritizer is configured to set the NF profile level priority by replacing a value of the NF profile level priority attribute in the NF profile with the priority value of the matching servingScope attribute value in the servingScopeSet, and the SCP or SEPP is configured to route the NF service request to the producer NF based on the value of the NF profile level priority attribute.

17. The system of claim 16 wherein the SCP or SEPP is configured to perform initial or alternate routing of the NF service request to the producer NF.

18. A non-transitory computer readable medium having stored thereon executable instructions that when executed by a processor of a computer control the computer to perform steps comprising:
receiving a service based interface (SBI) request including a preferred locality attribute value or a servingScope attribute value;
identifying a network function (NF) profile of a producer NF with an NF profile level locality attribute value that does not match the preferred locality attribute value in the SBI request or a servingScope attribute value that does not match the servingScope attribute value in the SBI request, wherein the NF profile includes a localitySet and a servingScopeSet, the localitySet is an NF profile attribute that is separate from the NF profile level locality attribute value, the servingScopeSet is an NF profile attribute separate from the NF profile level servingScope attribute value, the localitySet includes a plurality of locality attribute values and corresponding priority values, and the servingScopeSet includes a plurality of servingScope attribute values and corresponding priority values;

when the SBI request includes a preferred locality attribute value that does not match the NF profile level locality attribute value and that matches one of the locality attribute values in the localitySet, setting an NF profile level priority of the NF profile based on the priority value specified for the matching locality attribute value in the localitySet; and when the SBI request includes a servingScope attribute value that does not match the NF profile level servingScope attribute value and that matches one of the servingScope attribute values in the servingScopeSet, setting the NF profile level priority of the NF profile based on the priority of the matching servingScope attribute value in the servingScopeSet.

* * * * *

UNITED STATES PATENT AND TRADEMARK OFFICE
CERTIFICATE OF CORRECTION

| | |
|---|---|
| PATENT NO. | : 11,888,957 B2 |
| APPLICATION NO. | : 17/543989 |
| DATED | : January 30, 2024 |
| INVENTOR(S) | : Krishan |

It is certified that error appears in the above-identified patent and that said Letters Patent is hereby corrected as shown below:

In the Specification

In Column 6, Line 35, delete "ID," and insert -- D; --, therefor.

In Column 14, Line 1, delete "FIG." and insert -- FIGS. --, therefor.

In Column 14, Line 17, delete "incudes" and insert -- includes --, therefor.

In the Claims

In Column 16, Line 36, in Claim 4, delete "an," and insert -- an NRF, --, therefor.

In Column 16, Line 39, in Claim 4, after "values" delete "that".

In Column 17, Line 53, in Claim 11, after "values" delete "that".

In Column 17, Line 64, in Claim 12, after "attribute" delete "that".

Signed and Sealed this
Fourteenth Day of May, 2024

Katherine Kelly Vidal
*Director of the United States Patent and Trademark Office*